(12) United States Patent
Motose et al.

(10) Patent No.: US 6,364,726 B1
(45) Date of Patent: Apr. 2, 2002

(54) CONTROL SYSTEM FOR OUTBOARD MOTOR

(75) Inventors: Hitoshi Motose; Kazumasa Tanimoto; Kimihiro Nonaka; Takehisa Suzuki, all of Hamamatsu (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/574,103

(22) Filed: May 18, 2000

(30) Foreign Application Priority Data

| May 18, 1999 | (JP) | ............................................. | 11-136908 |
| May 18, 1999 | (JP) | ............................................. | 11-136909 |
| May 18, 1999 | (JP) | ............................................. | 11-136910 |

(51) Int. Cl.⁷ ............................................. B60K 41/00

(52) U.S. Cl. ........................................ 440/86; 477/113

(58) Field of Search .............................. 440/88, 87, 75, 440/84, 85, 86; 474/113, 905, 111, 112, 101, 102, 105, 107; 123/73 C

(56) References Cited

U.S. PATENT DOCUMENTS

| 4,409,938 A | 10/1983 | Fujimoto et al. |
| 4,459,951 A | 7/1984 | Tobinaga et al. |
| 4,475,502 A | 10/1984 | Matsumoto |
| 4,695,822 A | 9/1987 | Furukawa |
| 4,708,669 A | 11/1987 | Kanno et al. |
| 4,739,236 A | 4/1988 | Burkenpas |
| 4,790,279 A | 12/1988 | Tobinaga et al. |
| 4,850,318 A | 7/1989 | Torigai et al. |
| 4,895,120 A | 1/1990 | Tobinaga et al. |
| 4,903,662 A | 2/1990 | Hirukawa et al. |
| 4,951,624 A | 8/1990 | Hirano |
| 4,951,640 A | 8/1990 | Hirukawa et al. |

(List continued on next page.)

OTHER PUBLICATIONS

Co–pending application: Ser. No. 08/957,981, filed Oct. 21, 1997, entitled Engine Control, in the name(s) of Yoshibumi Iwata, Kuzuhiro Nakamura, and assigned to Sanshin Kogyo, Kabushiki Kaisha.

Co–pending application: Ser. No. 09/111,821, filed Jul. 8, 1998, entitled Ignition Timing Control for Marine Engine, in the name(s) of Akihiko Hoshiba, Kazuhiro Nakamura, and assigned to Sanshin Kogyo Kabushiki Kaisha.

Co–pending application: Ser. 09/210,183, filed Dec. 11, 1998, entitled Engine Feedback Control, in the name(s) of Hitoshi Motose, Masahiko Kato, and assigned to Sanshin Kogyo Kabushiki Kaisha.

Co–pending application: Ser. No. 09/209,537, filed Dec. 11, 1998, entitled Start–Up Strategy for Engine Feed Back Control, in the name(s) of Hitoshi Motose, Masahiko Kato, and assigned to Sanshin Kogyo Kabushiki Kaisha.

Co–pending application: Ser. No. 09/291,825, filed Apr. 14, 1999, entitled Fuel Injection Control System, in the name(s) of Takayuki Sato, Masahiko Kato, Hitoshi Motose, and assigned to Sanshin Kogyo Kabushiki Kaisha.

Primary Examiner—Jesus D. Sotelo
(74) Attorney, Agent, or Firm—Knobbe, Martens, Olson & Bear, LLP

(57) ABSTRACT

An outboard motor includes the direct fuel injection system. The outboard motor also includes an ECU that monitors various engine operating conditions and controls various engine operating parameters that are at least partially dependent on the positioning of the transmission. In instances in which the transmission is positioned in a neutral location, the load is decreased and therefore the ECU outputs one set of parameters. In similar low-speed operations, when the transmission is placed in a drive arrangement, the ECU outputs a second set of parameters due to the increased load. Several control routines are disclosed which facilitate low-speed operation, over-rev limiting, and engine warm-up.

74 Claims, 17 Drawing Sheets

U.S. PATENT DOCUMENTS

| | | | |
|---|---|---|---|
| 4,965,549 | A | 10/1990 | Koike |
| 4,966,115 | A | 10/1990 | Ito et al. |
| 4,998,521 | A | 3/1991 | Inoue et al. |
| 5,016,553 | A | 5/1991 | Spencer |
| 5,050,461 | A | 9/1991 | Onoue et al. |
| 5,060,617 | A | 10/1991 | Kojima et al. |
| 5,062,401 | A | 11/1991 | Suganuma |
| 5,073,133 | A | 12/1991 | Inoue |
| 5,117,792 | A | 6/1992 | Kanno |
| 5,136,279 | A | 8/1992 | Kanno |
| 5,184,589 | A | 2/1993 | Nonaka |
| 5,190,487 | A | 3/1993 | Fukui |
| 5,203,727 | A | 4/1993 | Fukui |
| 5,241,939 | A | 9/1993 | Nonaka |
| 5,251,602 | A | 10/1993 | Kurihara et al. |
| 5,309,882 | A | 5/1994 | Hoshiba et al. |
| 5,387,163 | A | 2/1995 | Sakamoto et al. |
| 5,450,830 | A | 9/1995 | Katoh |
| 5,474,053 | A | 12/1995 | Suzuki |
| 5,546,919 | A | 8/1996 | Iida et al. |
| 5,575,266 | A | 11/1996 | Iida |
| 5,584,266 | A | 12/1996 | Motose et al. |
| 5,586,524 | A | 12/1996 | Nonaka et al. |
| 5,588,416 | A | 12/1996 | Suzuki et al. |
| 5,606,952 | A | 3/1997 | Kanno et al. |
| 5,615,661 | A | 4/1997 | Suzuki |
| 5,645,032 | A | 7/1997 | Motose |
| 5,669,349 | A | 9/1997 | Iwata et al. |
| 5,687,694 | A | 11/1997 | Kanno |
| 5,690,063 | A | 11/1997 | Motoyama et al. |
| 5,697,353 | A | 12/1997 | Katoh et al. |
| 5,699,766 | A | 12/1997 | Saito |
| 5,713,334 | A | 2/1998 | Anamoto |
| 5,720,257 | A | 2/1998 | Motose et al. |
| 5,732,674 | A | 3/1998 | Motoyama et al. |
| 5,738,074 | A | 4/1998 | Nakamura et al. |
| 5,758,616 | A | 6/1998 | Motose |
| 5,769,041 | A | 6/1998 | Suzuki et al. |
| 5,769,055 | A | 6/1998 | Motose et al. |
| 5,778,857 | A | 7/1998 | Nakamura et al. |
| 5,782,659 | A | 7/1998 | Motose |
| 5,797,371 | A | 8/1998 | Nonaka |
| 5,797,775 | A | 8/1998 | Ozawa et al. |
| 5,826,557 | A | 10/1998 | Motoyama et al. |
| 5,827,150 | A | 10/1998 | Mukumoto |
| 5,868,118 | A | 2/1999 | Yoshioka |
| 5,921,220 | A | 7/1999 | Kato |
| 5,941,743 | A | 8/1999 | Kato |
| 5,970,951 | A | 10/1999 | Ito |
| 5,983,878 | A | 11/1999 | Nonaka et al. |
| 6,015,317 | A | 1/2000 | Hoshiba et al. |
| 6,032,653 | A | 3/2000 | Anamoto |
| 6,039,012 | A | 3/2000 | Motoyama |
| 6,067,957 | A | 5/2000 | Motose et al. |
| 6,087,735 | A | 7/2000 | Nakamura |
| 6,012,755 | A | 8/2000 | Hoshiba |
| 6,098,591 | A | 8/2000 | Iwata |
| 6,109,235 | A | 8/2000 | Hoshiba et al. |
| 6,109,986 | A | 8/2000 | Gaynor et al. |
| 6,119,453 | A | 9/2000 | Motose et al. |
| 6,135,095 | A | 10/2000 | Motose et al. |

# CONTROL SYSTEM FOR OUTBOARD MOTOR

PRIORITY INFORMATION

The present application is based on and claims priority to Japanese Patent Application Nos. 11-136908, filed May 18, 1999, 11-136909, filed May 18, 1999, and 11-136910, filed May 18, 1999, the entire contents of which are hereby expressly incorporated by reference.

BACKGROUND OF THE INVENTION

1. Field of the Invention

The present invention generally relates to fuel-injected two-stroke engines for outboard motors. More particularly, the present invention relates to improved control systems for such engines.

2. Related Art

Two cycle engines are widely used, particularly in applications where high specific outputs and relatively uncomplicated, simple engine constructions are desirable. Thus, two cycle engines are frequently employed as power plants in marine outboard motors because of the small space available in the powerheads of such engines and the demand for relatively high performance.

The two cycle engines, however, tend to be very temperamental. For instance, during idle operation, the engines often experience rough operation because of poor scavenging efficiencies. Poor scavenging leaves larger amounts of exhaust gases within the combustion chamber at the end of the exhaust cycle and, therefore, reduces the amount of fresh oxygen available for combustion. Thus, power output may vary from cylinder to cylinder and from stroke to stroke.

In some instances, poor scavenging efficiencies are caused by low air flow rates into the combustion chamber. Accordingly, to increase the displacement of the exhaust gases during the exhaust cycle, the throttle can be opened slightly more. This, of course, results in an increase in power and a higher rate of engine operation during idle, which can cause shifting difficulty with a shiftable transmission.

Moreover, movement of the transmission between drive and neutral results in differing loads being placed on the engine. Accordingly, the engine idle speed varies depending upon the drive state of the transmission. Particularly, the engine typically idles at a lower speed when the transmission is in a neutral drive state, which further compounds the scavenging problem described above. Accordingly, vibrations often develop within the hull of the watercraft due to rough idling with the transmission set in a neutral position.

A further difficulty with two cycle engines relates to so-called over-revving of the engine. Such over-revving can occur, for instance, when the propeller skids as a result of cavitation, or when the engine is raced while in neutral. Often such over-revving is limited by misfiring a cylinder such that the engine speed is reduced. During such misfiring, the fuel injectors typically continue to inject the same amount of fuel as normal operation into the combustion chamber to cool the piston in the misfired cylinder. In addition, the cylinder continues to have exhaust strokes. Accordingly, a fresh charge, which includes less residual exhaust gas, more oxygen and, sometimes, more fuel remains within the combustion chamber of the misfired cylinder. After the over-revving has been corrected, the cylinder then is fired. The return to firing can be accompanied by an abnormally high pressure following combustion. In some circumstances, a gasket between the cylinder head and the cylinder body can be blown through. Of course, this is a potentially serious situation encountered following over-revving of some corrected two cycle engines.

Moreover, during warm-up, direct injected engines often employ an increased idle speed to help warm the engine and to decrease idle speed fluctuations during start-up. However, the warm-up speed often is only maintained for a preset period. In some instances, this preset period of time is insufficient to achieve a high enough operating temperature and the engine cannot maintain operation due to poor fuel atomization. Thus, the engine may have a cylinder that misfires after the idle speed drops. The misfire can cause the engine to stall. Accordingly, this is yet another difficulty with direct injected two cycle engines.

SUMMARY OF THE INVENTION

For the above reasons, it is desired to have a two cycle direct injected engine that is controlled to remediate at least one, but preferably more than one, of the aforementioned drawbacks.

Accordingly, one aspect of the present invention involves an outboard motor comprising an engine and a propulsion unit. The engine has an output shaft and the propulsion unit comprises a propeller shaft. A shiftable transmission is interposed between the output shaft and the propulsion unit. The shiftable transmission is adapted to move between a neutral state and a drive state whereby movement of the output shaft is removed from the propeller shaft when the shiftable transmission is in the neutral state and movement of the output shaft is transferred to the propeller shaft when the shiftable transmission is in the drive state. The outboard motor further comprises a control unit adapted to control at least one operating parameter of the engine. A shift detector is in electrical communication with the control unit and is adapted to output a signal indicative of a shift state of the shiftable transmission. An engine speed sensor is in electrical communication with the control unit and is adapted to output a signal indicative of an engine speed. A throttle angle sensor is in electrical communication with the control unit and is adapted to output a signal indicative of a throttle angle. The control outputs a first signal if a first input condition is satisfied and outputs a second signal if a second input condition is satisfied.

Another aspect of the present invention involves a method of controlling a direct injected engine with a controller. The method comprises sensing a shift position, sensing an engine speed and comparing the sensed engine speed to a preset engine speed. A throttle position is sensed and compared to a preset throttle position. A first action is taken depending upon the sensed shift position as long as the sensed engine speed is lower than the preset engine speed and the sensed throttle position is lower than the preset throttle position.

A further aspect of the present invention involves a method of controlling a direct injected engine with a controller. The method comprises an over revolution limiting routine that comprises sensing an engine speed, comparing the sensed engine speed with a first preset speed, taking a first evasive action if the sensed engine speed exceeds the first preset speed, comparing the sensed engine speed with a second preset engine speed and taking a second evasive action if the sensed engine speed exceeds the second preset speed.

Another aspect of the present invention involves a method of controlling a direct injected engine with a controller. The method comprises advancing an ignition timing of the engine a first preset advance amount, sensing an engine speed and starting a counter, comparing the sensed engine speed to a first preset speed and the counter value to a preset value, changing the ignition timing to a second preset advance amount when the sensed engine speed exceeds the first preset speed or the counter value exceeds the preset value.

A further aspect of the present invention involves an engine comprising at least one cylinder with a piston being mounted for reciprocation within the cylinder. A cylinder head is mounted to the cylinder and cooperates with the piston and the cylinder to define a variable volume combustion chamber. A fuel injector is disposed to supply a fuel charge to the combustion chamber and a fuel supply system communicates with the fuel injector. The fuel supply system comprises a high pressure portion and a low pressure portion. The fuel injector is positioned along the high pressure portion with a bypass line connecting the high pressure portion and the low pressure portion. A valve is positioned along the bypass line and a controller is adapted to control the valve such that a flow rate through the bypass line can be controlled.

BRIEF DESCRIPTION OF THE DRAWINGS

These and other features, aspects and advantages of the present invention will now be described with reference to the drawings of several preferred embodiments, which embodiments are intended to illustrate and not to limit the invention, and in which drawings.

DETAILED DESCRIPTION OF THE PREFERRED EMBODIMENTS OF THE INVENTION

Figure 1:
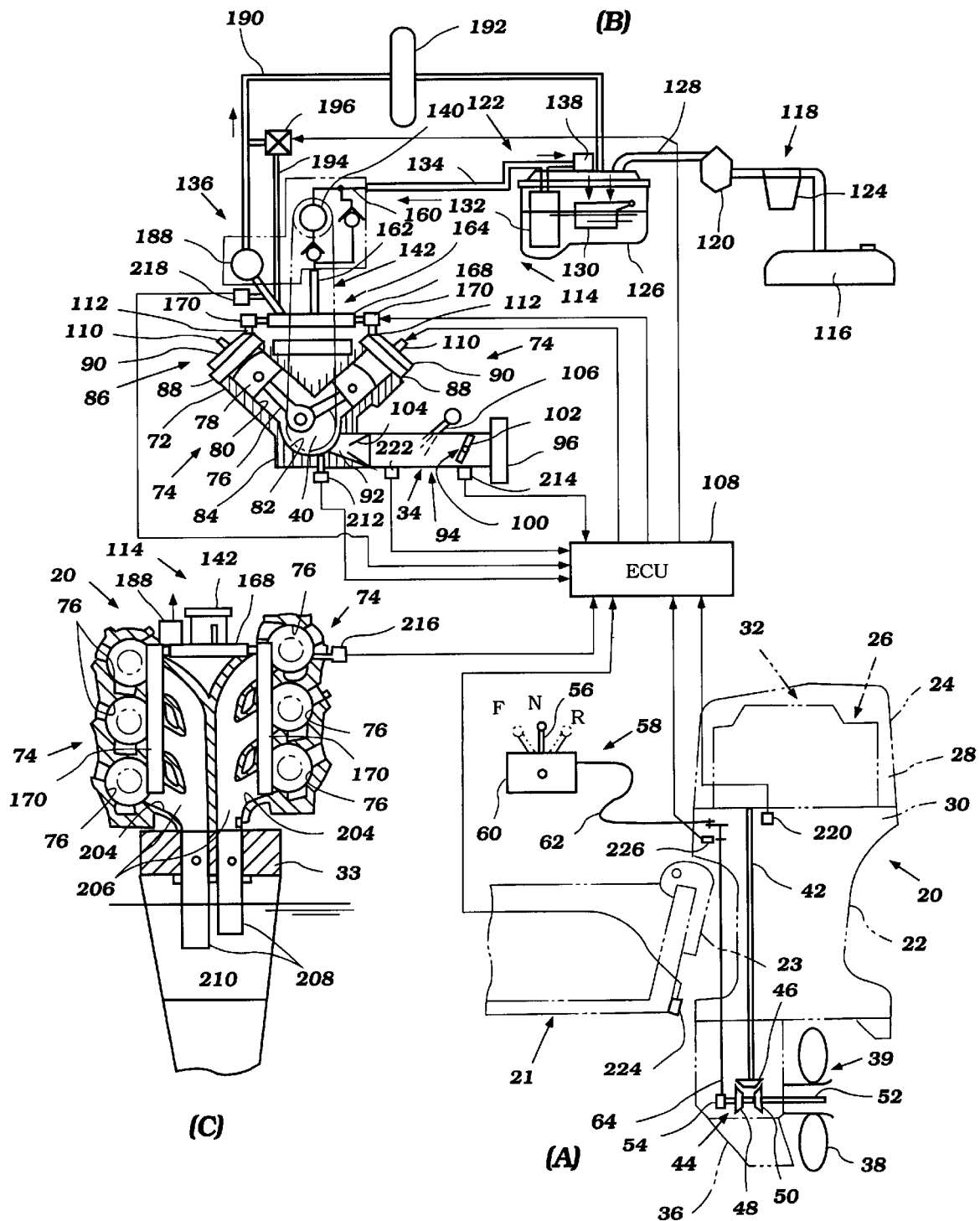
FIG. 1 is a multi-part view showing: (A) in the lower right-hand portion, a side elevation view of an outboard motor embodying certain features, aspects and advantages of the present invention; (B) in the upper view, a partially schematic view of the engine of the outboard motor with its induction and fuel injection system shown in part schematically; and (C) in the lower left-hand portion, a rear elevation view of the outboard motor with portions removed and other portions broken away and shown in section along the line C—C in the upper view (B) so as to more clearly show the construction of the engine. An ECU (Electric Control Unit) for the motor links the three views together.

With reference initially to FIG. 1, an outboard motor with a control system having certain features, aspects and advantages of the present invention will be described. While the present invention will be described in the context of the outboard motor, it is anticipated that the present invention can have utility in other environments of use. For instance, the control system can find utility in stern-drive watercraft, personal watercraft, jet boats and the like. In addition, some features of the present invention can be used in land vehicles, such as snowmobiles, all terrain vehicles and the like.

In the lower-right hand view of FIG. 1 (i.e., FIG. 1(A)), the outboard motor is depicted in side elevation view and is identified generally by the reference numeral 20. The outboard motor 20 preferably is connected to a transom of a watercraft 21 with a clamp/swivel bracket 23. The outboard motor 20 generally comprises a drive shaft housing 22 and a power head 24, which is positioned generally above and generally supported by the driveshaft housing 22. The power head 24 advantageously includes a powering internal combustion engine, which is indicated generally by the reference numeral 26. The engine 26 is also shown in the remaining two views of FIG. 1 (i.e., FIGS. 1(B) and 1(C)) and, therefore, will be described in more detail below with reference to these portions of FIG. 1.

The illustrated power head 24 has a protective cowling which generally comprises a main cowling portion 28 and a lower tray portion 30. The illustrated main cowling portion 28 includes a suitable air inlet arrangement 32 to introduce atmospheric air into the interior of the protective cowling 28. The air present within the protective cowling 28 may then be drafted into an engine air induction system, which is indicated generally by the reference numeral 34 (FIG. 1(B)) and which will be described in greater detail directly below.

The main cowling portion 28 preferably is detachably connected to the lower tray portion 30 of the power head 24 around an exhaust guide plate 33 (FIG. 1(C)). The illustrated exhaust guide plate 33 encircles an upper portion of the driveshaft housing 22 and forms a portion of an exhaust system. Positioned beneath the illustrated driveshaft housing 22 is a lower unit 36 in which a propeller 38 in journaled. The propeller 38 forms at least a portion of the propulsion device 39 for the associated watercraft.

As is typical with outboard motor practice, the illustrated engine 26 is supported in the power head 24 so that a crankshaft 40 (FIG. 1(B)) may rotate about a generally vertically extending axis. This is done to facilitate connection of the crankshaft 40 to a driveshaft 42 that depends into, and extends through, the driveshaft housing 22. The driveshaft 42 drives the propeller 38 through a forward, neutral, and reverse transmission 44 contained in the lower unit 36. Of course, other types of transmissions also can be used with the present invention.

The illustrated transmission 44 includes a bevel gear 46 that is disposed on a lower end of the driveshaft 42. The illustrated bevel gear 46 is selectively engageable with a forward drive gear 48 and a reverse drive gear 50. In addition, the bevel gear can be disengaged from both the forward drive gear 48 and the reverse drive gear 50 to place the transmission in a non-driving or neutral position. Preferably, the forward drive gear 48 and the reverse drive gear 50 are splined for axial movement along a propeller shaft 52. In this manner, the gears 48, 50 can be moved into engagement with the bevel gear 48 with a dog clutch arrangement 54, such as those generally known to those of ordinary skill in the art.

The movement of the dog clutch arrangement 54 is controlled by an operator using a shift lever 56 that preferably is disposed within an operator compartment of the watercraft. It should be recognized, however, that the connection between the dog clutch arrangement 54 and the shift lever 56 can include a separable component such that the outboard motor 20 can be removed from the watercraft while the shift lever 56 remains mounted to the watercraft.

The shift lever 56 forms a portion of a shift mechanism 58 that preferably allows an operator to select from a number of drive arrangements, such as neutral N, forward F and reverse R, for instance. In addition, in at least some arrangements, the shift lever is mounted within a shift case 60 that is removable from the watercraft with the motor 20.

A flexible connector 62, such as a shift cable, for instance, extends between the shift lever 56 to an upper end of a shift rod 64, in the illustrated arrangement. Movement of the shift lever 56 results in rotation of the shift rod 64 about a center axis of the shift rod 64, as is generally known to those of ordinary skill in the art. The rotational movement of the shift rod 64 results in translating movement of the dog clutch arrangement 54. The translating movement of the dog clutch arrangement 54 results in operable movement of the transmission 44, similar to transmissions that are well known in this art.

With reference now to FIG. 1(C), the illustrated engine 26 is of the V6 type and operates on a two stroke, crankcase compression principle. Although the present control system is primarily described in conjunction with an engine having this cylinder number and cylinder configuration, it will be readily apparent to those of ordinary skill in the art that the present control system can be utilized with engines having other cylinder numbers and other cylinder configurations. Moreover, certain features of the present control system also may find utility with engines operating on other operating principals, such as a four-cycle engine.

With reference now to FIG. 1(B), the illustrated engine 26 is comprised of a cylinder block 72 that is formed with a pair of cylinder banks 74. Each of these cylinder banks 74 is preferably formed with three vertically spaced, horizontally extending cylinder bores 76. In some arrangements, separated cylinder bodies can be used in place of the cylinder block that accommodates more than one cylinder bore. As will be recognized by those of ordinary skill in the art, a set of corresponding pistons 78 can be arranged and configured to reciprocate in these cylinder bores 76. The illustrated pistons 78 are, in turn, connected to the small ends of connecting rods 80. The big ends of the connecting rods 80 are preferably journaled about the throws of the crankshaft 40 in a well-known manner.

With continued reference to FIG. 1(B), the illustrated crankshaft 40 is journaled in any suitable manner for rotation within a crankcase chamber 82. Desirably, the crankcase chamber 82 is formed, in part, by a crankcase member 84 that may be connected to the cylinder block 72 in any suitable manner. As is typical with two stroke engines, the illustrated crankshaft 40 and crankcase chamber 82 are formed with dividing seals or dividing walls, such that each section of the crankcase chamber 82 associated with one of the cylinder bores 86 may be sealed from the other sections that are associated with corresponding cylinder bores. This type of construction is also well known in the art.

With reference to FIG. 1(B), a cylinder head assembly, indicated generally by the reference numeral 86, preferably is connected to an end of each of the cylinder banks 74 that is spaced from the crankcase chamber 82. Each cylinder head assembly 86 is generally comprised of a main cylinder head member 88, which defines a plurality of recesses (not shown) in its lower face, and a cylinder head cover member 90. In the illustrated engine 26, each of the recesses (not shown) cooperate with a respective cylinder bore 76 and a head of a respective piston 78 to define a combustion chamber. The cylinder head cover member 90 completes the illustrated cylinder head assembly 86. The cylinder head components 88, 90 desirably are secured to each other and to the respective cylinder banks 44 using any suitable manner.

With reference to FIG. 1(B), the air induction system 34 is provided for delivering an air charge to the sections of the crankcase chamber 82 associated with each of the cylinder bores 76. In the illustrated embodiment, communication between the sections of the crankcase chamber and the air contained within the cowling occurs, in part, via an intake port 92 formed in the crankcase member 84. The intake port 92 registers with a crankcase chamber section corresponding to each of the individual cylinder bores 76.

The induction system 34 also includes an air silencing and inlet device, which is shown schematically in FIG. 1(B), indicated generally by the reference numeral 94. In one arrangement, the device 94 is contained within the cowling member 28 at the cowling's forward end and has a rearwardly facing air inlet opening 96 through which air is introduced into the silencer 94. Air can be drawn into the silencer 94 from within the cowling 28 through an inlet opening 96.

The air inlet device 94 supplies the induced air to a plurality of throttle bodies, or induction devices, 100 each of which preferably has a throttle valve 102 provided therein. The illustrated throttle valves 102 are desirably supported on throttle valve shafts (not shown) that are linked to each other for simultaneous opening and closing of the throttle valves 102 in a manner that is well known to those of ordinary skill in the art. It is anticipated, however, that a single supply passage can extend to more than one or even all of the chambers such that the number of throttle valves can be one or more than one, depending upon the application.

Lubricant pumps 106 are provided for spraying lubricant into the throttle bodies 100 for engine lubrication under the control of an ECU (Electronic Control Unit) 108 that will be described more in detail later. Although it is not shown, some forms of direct lubrication may be also employed for delivering lubricant directly to certain components of the engine.

As is typical in two-cycle engine practice, the illustrated intake ports 92 include reed-type check valves 104. The check valves 104 permit inducted air to flow into the sections of the crankcase chamber 82 when the pistons 78 are moving upwardly in their respective cylinder bores 76. However, as the pistons 78 move downwardly, the charge will be compressed in the sections of the crankcase chamber 82. At that time, the reed type check valve 104 will close to permit the charge to be compressed.

The charge, which is compressed in the sections of the crankcase chamber 82, is then transferred to the combustion chambers (not shown) through a scavenging system or the like that terminates in scavenging ports (not shown) in a manner that is well known.

A spark plug 110 is mounted in the cylinder head assembly 86 for each cylinder bore 76. The spark plugs 110 are fired under the control of the ECU 108 in any suitable manner but preferably are controlled by any routine or aspect of the invention, which will be later described.

The spark plug 110 ignites a fuel air charge that is formed by mixing fuel directly with the intake air in the combustion chambers (not shown) via a respective fuel injector 112. The fuel injectors 112 are preferably of the solenoid type and are preferably electrically operated under the control of the ECU 108. Thus, the fuel injector can be controlled to vary its opening and closing timing, which changes the period it is opened and the flow period for its fuel throughput. The fuel injectors 112 can be mounted directly in the cylinder head 86 in a specific location to provide optimum fuel vaporization or diffusion under all running conditions.

Fuel is supplied to the fuel injectors 112 by a fuel supply system, indicated generally by the reference numeral 114 (see FIGS. 1(B) and 1(C)). The fuel supply system 114 comprises a main fuel supply tank 116 that is provided in the hull of the watercraft 21 with which the outboard motor 20 is associated. Fuel is drawn from this tank 116 through a supply conduit 118 by means of a first low pressure pump 120 and, in some arrangements, a plurality of secondary low pressure pumps. The pumps can be manually operated pumps, diaphragm type pumps operated by variations in pressure in the sections of the crankcase chamber 82, or any other suitable pump. Preferably, the pump 120 provides a relatively low pressure draw on the fuel supply.

A quick disconnect coupling (not shown) can be provided along the conduit 118. In addition, a fuel filter 124 may be positioned along the conduit 118 at an appropriate location within the main cowling portion 28 for ease of servicing.

From the low-pressure pump 120, fuel is supplied to a pre-pressurized or low pressure fuel supply system 122. This system preferably includes a vapor separator 126, which can be mounted on the engine 26 or within the cowling portion 28 at an appropriate location. The fuel is supplied to the vapor separator 126 through a supply line 128. At the vapor separator end of the supply line 128, there preferably is provided a valve (not shown) that can be operated by a float 130 so as to maintain a substantially uniform level of fuel in the vapor separator 126.

A fuel pump 132 can be provided in the vapor separator 126 and can be controlled by the ECU in a known manner. The fuel pump 132 preferably pre-pressurizes the fuel that is delivered through a fuel supply line 134 to a high pressure pumping apparatus, indicated generally by the reference numeral 136. The fuel pump 132, which can be driven by an electric motor, preferably develops a pressure such as 3 to 10 kg/cm². A low pressure regulator 138 can be positioned in the line 134 proximate the vapor separator 126 to limit the pressure of the fuel that is delivered to the high pressure pumping apparatus 136 by dumping some portion of the fuel back into the vapor separator 126.

The illustrated high pressure fuel delivery system 136 includes a high pressure fuel pump 140 that can develop a pressure of, for example, 50 to 100 kg/cm² or more. A pump drive unit 142 (see FIG. 1(C)) preferably is provided for driving the high-pressure fuel pump 140. Of course, any suitable driving arrangement can be used.

The high pressure fuel pump 140 preferably has a unified fuel inlet and outlet module. The inlet and outlet module can include an inlet passage 160 connected with the line 134, an outlet passage 162 connected with a fuel injector supply system indicated generally at 164 and an overflow passage connected with the vapor separator 126. The line for returning the overflow fuel to the vapor separator 126 is omitted in the drawings.

Fuel can be supplied from the high-pressure fuel pump 140 to the fuel injector supply system 164 through the supply passage 162. The illustrated fuel injector supply system 164 is generally comprised of a main fuel manifold 168 that extends substantially horizontally. The main fuel manifold 168, in turn, delivers fuel to a pair of generally vertically extending fuel rails 170. The fuel rails 170 preferably deliver fuel to the fuel injectors 112.

In the illustrated embodiment, the pressure of the fuel supplied by the fuel pump 140 to the fuel injectors 112 is regulated to be a generally fixed value by a high pressure regulator 188 (See also FIG. 1) which dumps fuel back to the vapor separator 126 through a pressure relief line 190 in which a fuel heat exchanger or cooler 192 is provided. Generally, the fuel is desirably kept under constant pressure so that the volume of injected fuel can be at least partially determined by changes of duration of injection under the condition that the pressure for injection is always the same; however, as will be described below, under certain operating conditions, the supply volume of fuel is desirably decreased. One manner of creating such a decrease is by providing a bypass from the high pressure side of the fuel supply system 114 to the low pressure side of the fuel supply system. Such a bypass can be formed by a bypass passage 194 and a controllable valving arrangement 196. In the illustrated arrangement, the valving arrangement 196 comprises an electromagnetic valve that is selectively controllable by the ECU 108. Any suitable valving arrangement can be used. The usage of this arrangement will be further described below.

As illustrated, the fuel injectors 112 preferably are affixed between the fuel rails 170 and the cylinder head assemblies 86 and receive fuel from the fuel rails 170 in any suitable manner. The fuel injectors 112 are preferably of the solenoid-operated type and are operated from the ECU 108 via a solenoid driver. Preferably, the injection timing and duration, as well as the control for the timing of firing of the spark plugs 110, are controlled by the ECU 108.

Once the charge burns and expands, the pistons 78 will be driven downwardly in the cylinder bores 76 until the pistons 78 reach a lowermost position. At this time, an exhaust port will be uncovered by the piston 78 to allow communication with an exhaust passage 204 formed in the valley of the cylinder block 72. The exhaust gases flow through the exhaust passages 204 to a manifold collector section 206 of the respective exhaust manifolds that are formed within the cylinder block 72. The exhaust manifold collector sections 206 communicate with exhaust passages formed in the exhaust guide plate 32 on which the engine 26 is mounted.

A pair of exhaust pipes 208 depend from the exhaust guide plate 32 and extend the exhaust passages 204 into an expansion chamber 210 formed in the driveshaft housing 22. From this expansion chamber 210, the exhaust gases are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

The ECU 108 samples a variety of data for use in performing any of a number of control strategies which will be discussed herein. One or more than one of the control strategies can be combined or used independently. The control system generally comprises the ECU 108 as a control unit or device and a number of sensors which sense engine running conditions, ambient conditions and/or conditions of the outboard motor 20 that may effect general engine performance. Certain of the sensors are shown schematically in FIG. 1 and will be described by reference to that figure. It should be readily apparent to those skilled in the art, however, that other types of sensing arrangements can be provided.

In the illustrated embodiment, there is provided a crankshaft angle position sensor 212 associated with the crankshaft 40 which, when measuring crankshaft angle versus time, outputs a crankshaft rotational speed signal or engine speed signal to the ECU 108.

Operator demand or engine load, as determined by throttle angle of the throttle valve 102, is sensed by a throttle position sensor 214 which outputs a throttle position or load signal to the ECU 108.

A combustion condition or oxygen ($O_2$) sensor 216 is provided that senses the cylinder combustion conditions by sensing the residual amount of oxygen in the combustion products at a time near the time when the exhaust port is opened. This output and an air fuel ratio signal are preferably transmitted to the ECU 108.

There is also provided a pressure sensor 218 connected to the pressure regulator 188. This pressure sensor 218 outputs a high-pressure fuel signal to the ECU 108.

There also may be provided a water temperature sensor 220 (see FIG. 1(A)) which outputs a cooling water temperature signal to the ECU 108.

Further, an intake air temperature sensor 222 (see FIG. 1(B)) may be provided to output an intake air temperature signal to the ECU 108.

In addition, a watercraft speed sensor 224 (see FIG. 1(A)) can be disposed along the hull of the watercraft 21 to output a signal indicative of water speed for the moving vehicle. This signal, as illustrated, also is transmitted to the ECU 108.

Moreover, a shift position sensor 226 preferably is provided to detect the position of either a shift mechanism component or the transmission. For instance, the shift position sensor 226 can detect a positioning of the shift rod 42, as illustrated, or can detect a positioning of the shift lever 56, the dog clutch arrangement 54, the interrelationship of the bevel gears, or even the rotation of the propeller or propeller shaft. Of course, other arrangements also can be used.

Although these sensors are shown in FIG. 1, it is, of course, practicable to provide other sensors such as an engine height sensor, a trim angle sensor, a knock sensor, a neutral sensor, a watercraft pitch sensor and an atmospheric temperature sensor in accordance with various control strategies. Of course, the signals, while being depicted with wire connections, also can be transmitted using radio waves, infrared transmitter and receiver pairs or other similar or suitable techniques.

The ECU 108, as has been noted, outputs signals to the fuel injectors 112, spark plugs 110, the bypass control valve 196 and a portion of the fuel injector supply system 164 for their respective control. These control signals are indicated schematically in FIG. 1. Again, these signals can be transmitted in any suitable manner such as those described above.

Figure 2:
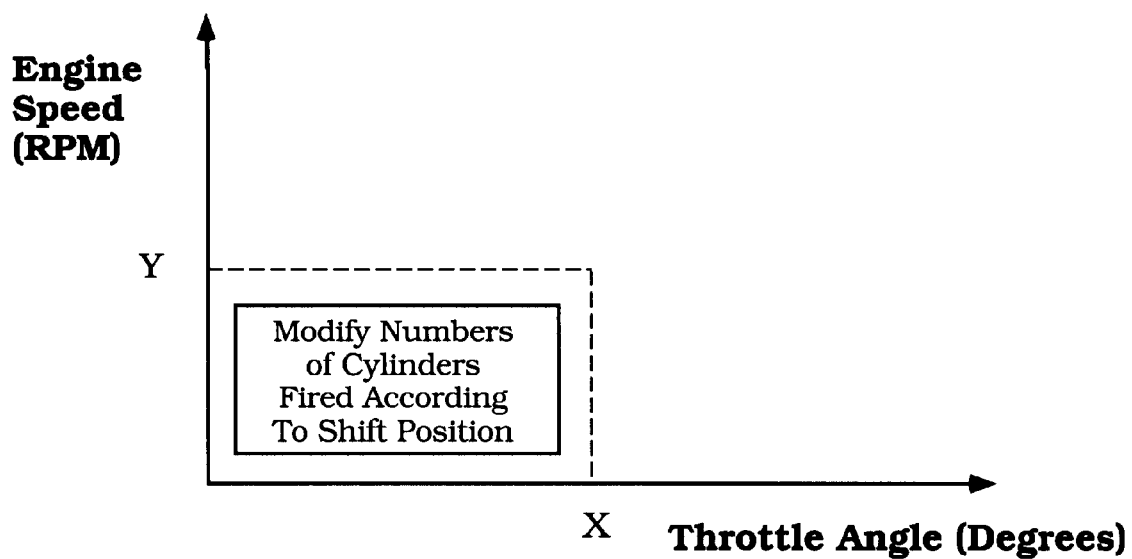
FIG. 2 is a graphical illustration of one aspect of the present invention involving modifying the number of firing cylinders in response to engine operating conditions and a shift position.

With reference now to FIG. 2, a graphical illustration of one aspect of the present invention involving a modification of the number of firing cylinders in response to changes in engine operating conditions and transmission shift positions is illustrated. In this graphical depiction, a first state is identified in which a throttle angle is less than X degrees and an engine speed is less than Y degrees. Within this first stage, the number of cylinders is modified according to the shift position. In this manner, the low-speed operation of the engine, such as during idle, can be smoothed by increasing the throttle angle and allowing more air to flow into each of the combustion chambers through the induction system while disabling certain of the cylinders to arrive at a lower power output during the low-speed operation. In one arrangement, the throttle angle X is approximately 7°. Of course, other throttle opening angles can also be used depending upon the application. In the same arrangement in which the throttle angle X is about 7°, the engine speed Y preferably is about 1000 rpm. Of course, the engine speed value also can vary depending upon the application. It has been found, however, that about 1000 rpm and about 7° of throttle angle result in satisfactory low-speed operating conditions for outboard motors having a V-6 configuration.

Figure 3:
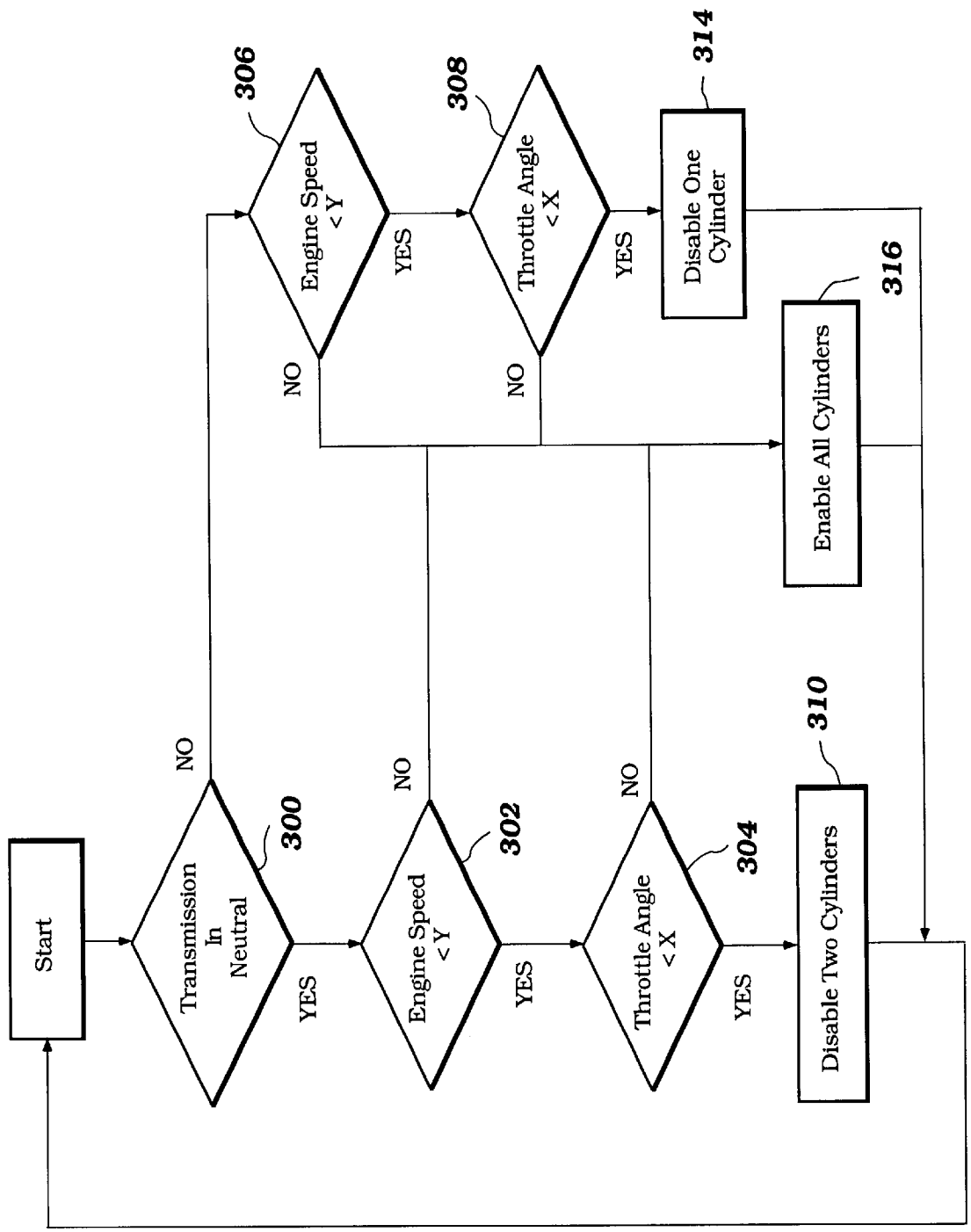
FIG. 3 is an exemplary routine used to employ the aspect of the present invention depicted in FIG. 2.

With reference now to FIG. 3, a routine is illustrated therein which can be used to implement the aspect of the present invention which is graphically depicted in FIG. 2. This routine comprises a number of steps and operations. As will be apparent for each of the routines disclosed within this detailed description, certain of the operations will be described with reference to illustrated steps; however, it should be understood that at least some of the steps can be reordered, combined, or segregated as desired.

In the illustrated arrangement, the ECU 108 detects the position of the transmission shift arrangement. By detecting the position of the transmission shift arrangement or the shift lever 56, the ECU 108 can determine whether the transmission is in a drive arrangement or in a neutral arrangement (300). Of course, this detection can be made by the sensor 226 which outputs a signal indicative of the positioning of the shift rod 64 and, therefore, the transmission 44. Of course, other sensing arrangements can also be used to detect the positioning and the operational state of the transmission.

Depending on the determination of whether the transmission is in a neutral arrangement or in a drive arrangement, two separate subroutines are followed in the illustrated arrangement. One subroutine is followed if the transmission is in neutral and the other subroutine is followed if the transmission is engaged to drive the propeller 38. Both of the subroutines check the engine speed to determine whether the engine speed is less than a predetermined speed Y (302, 306). In the event that the engine speed is below the predetermined speed Y, the throttle angle is checked to see whether it is below a predetermined angle X (304, 308). In the event both the engine speed is lower than Y and the throttle angle is less than X, one or more cylinders is disabled depending on the drive state of the transmission (310, 314). For instance, in the event the transmission is in neutral, the ECU emits a signal to disable the firing of two of the illustrated cylinders (310). By disabling two cylinders in the illustrated arrangement, the engine speed is reduced while the throttle angle can be opened to allow increased air flow and better scavenging of the exhaust gases from the combustion chamber. The two cylinders can be disabled in any suitable manner. For instance, the ignition system can be interrupted or the injection system can be interrupted. Preferably, however, the ignition system is interrupted. It should be noted that for all cylinder disabling occurring throughout this detailed description, the disabled cylinders preferably are chosen so that each cylinder chosen for disabling has an equal phase during each revolution of the engine.

With continued reference to FIG. 3, in the event that the transmission is in a drive state (300) and the engine speed is less than Y (306) with a throttle angle of less than X (308), one of the illustrated cylinders is disabled. One cylinder is disabled in this arrangement, rather than two cylinders, due to the load demand placed on the engine with the transmission in the drive state.

In the event that the engine speed is greater than Y or the throttle angle is greater than X, all cylinders fire as they would in normal operation. These conditions indicate that the engine is operating in a second state, which is outside of that defined by the lines Y and X in FIG. 2. In this second state, the engine operates normally with all cylinders firing because the engine speed and throttle angle are indicative of an operational state of the engine in which the induction air flow is not so small as to result in poor scavenging characteristics.

In this arrangement, because only four cylinders out of six in the illustrated engine are operating with the engine idling and the transmission in neutral, a more consistent idle speed is maintained. Preferably, the idle speed is maintained at approximately 700 rpm. Under these operating conditions, the hull is subject to decreased vibrations and passenger comfort is increased. Moreover, if the transmission is in drive, then five of the illustrated six cylinders are operating. This configuration provides more than adequate power to act against the load provided by the propeller and the associated drive train. Furthermore, this configuration allows quick response to changes in desired engine speed and facilitates rapid acceleration from idle.

Figure 4:
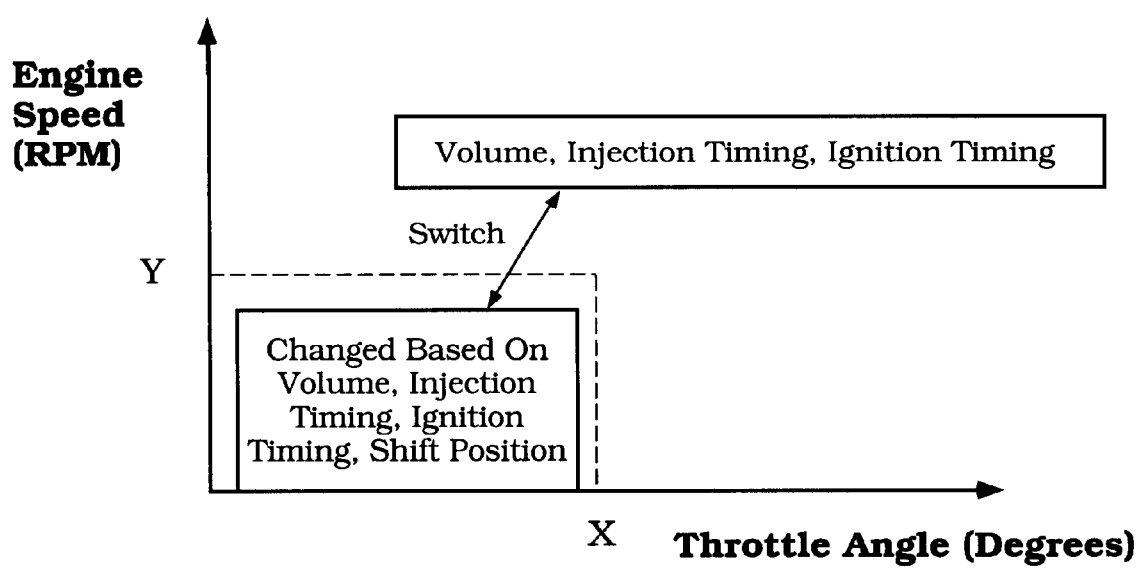
FIG. 4 is a graphical illustration of another aspect of the present invention involving altering any of a number of engine operating parameters in response to engine operating conditions and a shift position.

With reference now to FIG. 4, another aspect of the invention is illustrated graphically. In this aspect of the present invention, various operating parameters are altered in response to the shift position and other operating characteristics of the engine. For instance, in the illustrated arrangement of FIG. 4, various parameters such as, but not limited to, fuel injection volume, fuel injection timing, ignition timing, and the like are altered depending upon the positioning of the shift mechanism, the opening angle of the throttle and the engine speed. The control of the various parameters is performed by the ECU 108 in manners generally known to those of skill in the art; however, an exemplary routine for identifying how to decide what values to use in the control of the parameters is presented in FIG. 5.

With reference again to FIG. 4, a first state of engine operation is defined where an engine speed is less than Y and a throttle angle is less than X. These values can be the same as those described above or can differ depending upon the application. For instance, in the illustrated arrangement, X preferably is about 7° of throttle angle while Y is preferably about 1000 rpm. As mentioned above, these values can vary depending upon the application.

Figure 5:
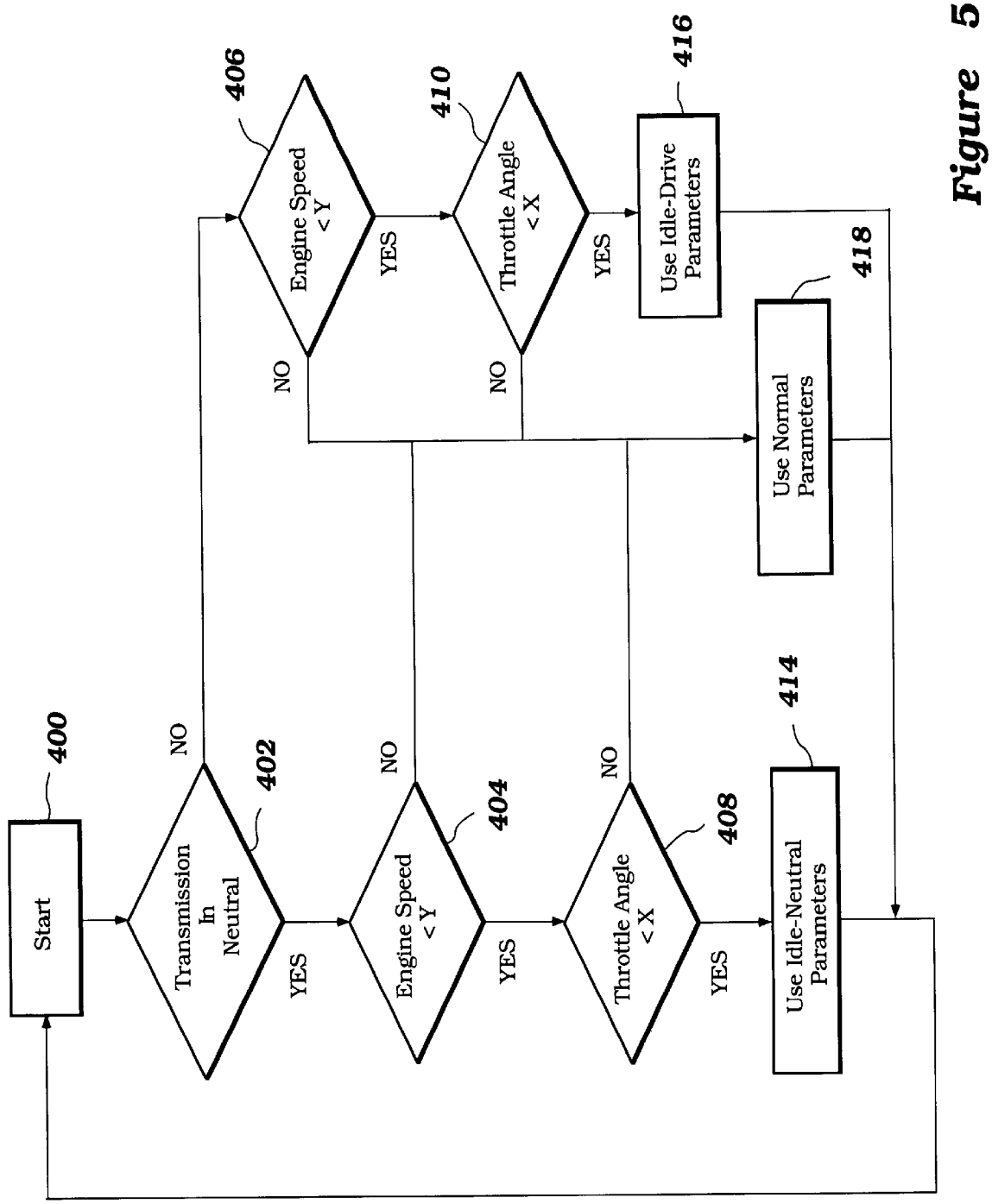
FIG. 5 is an exemplary routine used to employ the aspect of the present invention depicted in FIG. 4.

With reference to FIG. 5, the exemplary routine is illustrated therein in which the aspect of the present invention graphically depicted in FIG. 4 can be employed. In this routine, the ECU 108 performs similar steps to those of FIG. 3 in determining which values to apply. For instance, following a start 400, the ECU 108 checks to determine the positioning of the transmission mechanism (402). Regardless of the outcome of that determination, the ECU 108 will monitor the engine speed output by the crankshaft speed sensor 212, for instance, to determine whether the engine speed is less than the preset speed Y (404, 406). In the event that the engine speed is below the preset value Y, the ECU will check the throttle angle by sampling the input from the throttle angle sensor 214, for instance (408, 410). In the event the throttle angle is less than the present value X, the ECU 108 consults one of two sets of operating parameters (414, 416). In situations where the transmission is in neutral, the ECU consults a set of idle parameters that are designed for use with the transmission in neutral (414). These parameters may include preferred fuel injection duration or volume, fuel injection timings, and ignition timings. Similarly, if the transmission is detected to be in a drive state, the ECU consults a set of idle drive parameters (416). The idle drive parameters also generally comprise a fuel injection duration or volume, a fuel injection timing, and an ignition timing. These values are determined based upon the actual application to the engine and are set to result in smooth engine operation. These values typically vary from engine setup to engine setup and can be empirically determined for each application without undue experimentation.

In the illustrated arrangement, the fuel injection amount can be reduced if the transmission is in neutral. In addition, the ignition timing can be delayed slightly to help stabilize the idle speed while the air intake can be increased. If the transmission is in a drive position, then the fuel injection amount can be increased above that used for the neutral position and the ignition timing can be slightly advanced to allow the engine speed to meet the increased engine load.

With continued reference to FIG. 5, if the engine speed is greater than the preset value Y, or if the throttle angle is greater than the present value X, the ECU 108 consults a set of normal operating parameters, which can include fuel injection duration or amount, fuel injection timing and ignition timing, which are set for normal speed operation of the engine, i.e., engine speeds above 1000 rpm or a throttle angle greater than 7° in the illustrated arrangement. Preferably, these normal operating parameters are those that would be used in an engine not taking advantage of different parameters from idle states to normal drive or engine acceleration states.

Figure 6:
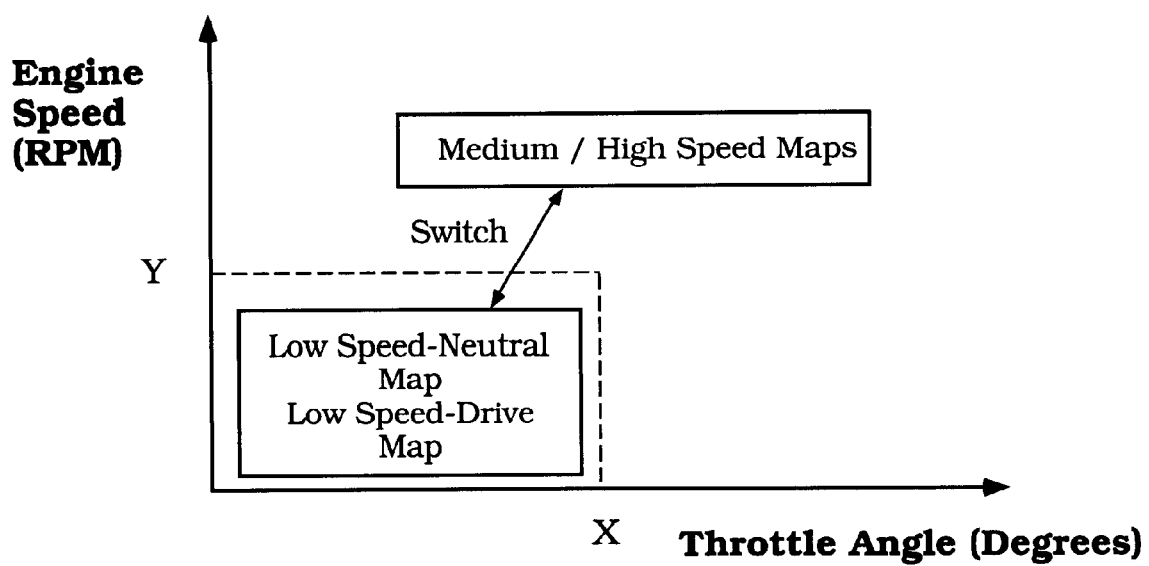
FIG. 6 is a graphical illustration of a further aspect of the present invention involving switching between a plurality of reference maps containing operating parameters for the engine in response to engine operating conditions and a shift position.

With reference now to FIG. 6, another aspect of the present invention which is very similar to that illustrated in FIGS. 4 and 5, is illustrated therein. In this arrangement, the engine 26 is controlled using a plurality of maps. As is known to those of ordinary skill in the art, the maps contain data which corresponds to various operating parameters and engine operating conditions. For instance, for a given set of sensed operating conditions, the map is used to provide a given set of operating parameters, such as fuel injection timing, fuel injection amount, and ignition timing, for instance. In the illustrated arrangement, a low-speed map for a neutral drive arrangement and a low-speed map for a drive arrangement are used when the engine speed is below a preset speed Y and the throttle angle is less than the present angle X. However, once the engine speed exceeds Y or the throttle angle exceeds X, a medium and/or high-speed map or maps are consulted. Thus, differing maps are consulted depending upon the state in which the engine and transmission are being operated.

With reference now to FIG. 6, a routine that is used to implement such a configuration is illustrated therein. In the illustrated routine, the ECU begins (500) and proceeds to check the operating state of the transmission (502). As described above, the transmission operating state can be checked by monitoring any of a number of features of the outboard motor 20. For instance, the shift lever position 56 can be monitored, the shift rod 64 can be monitored, the positioning of the dog clutch arrangement 54 can be monitored or the actual engagement between the forward gear 48, the reverse gear 50, and the bevel gear 46 can be monitored. Moreover, movement of the propeller shaft 52 can be monitored in some applications.

After the position of the transmission has been detected (502), the engine speed is sensed. Again, the engine speed can be sensed using any suitable technique, and the illustrated arrangement features a sensor that detects the rotational speed of the crankshaft. Of course, the engine speed can be continually sensed such that the order of these operations does not matter. The sensed engine speed is checked against a preset speed Y 504, 506. If the engine speed is less than Y (504, 506), the ECU 108 compares a sensed throttle angle to a preset throttle angle X. (508, 510). If the throttle angle is less than the preset angle X, then one of two low-speed maps is consulted and used to control the engine operation (512, 514). For instance, in scenarios in which the transmission is in neutral, as determined by the ECU 108 in the illustrated arrangement, the ECU 108 will consult a low-speed neutral map to control the engine (512). In the situation where the transmission is in a drive state, the ECU 108 will consult a low-speed drive map to control the engine (514).

Figure 7:
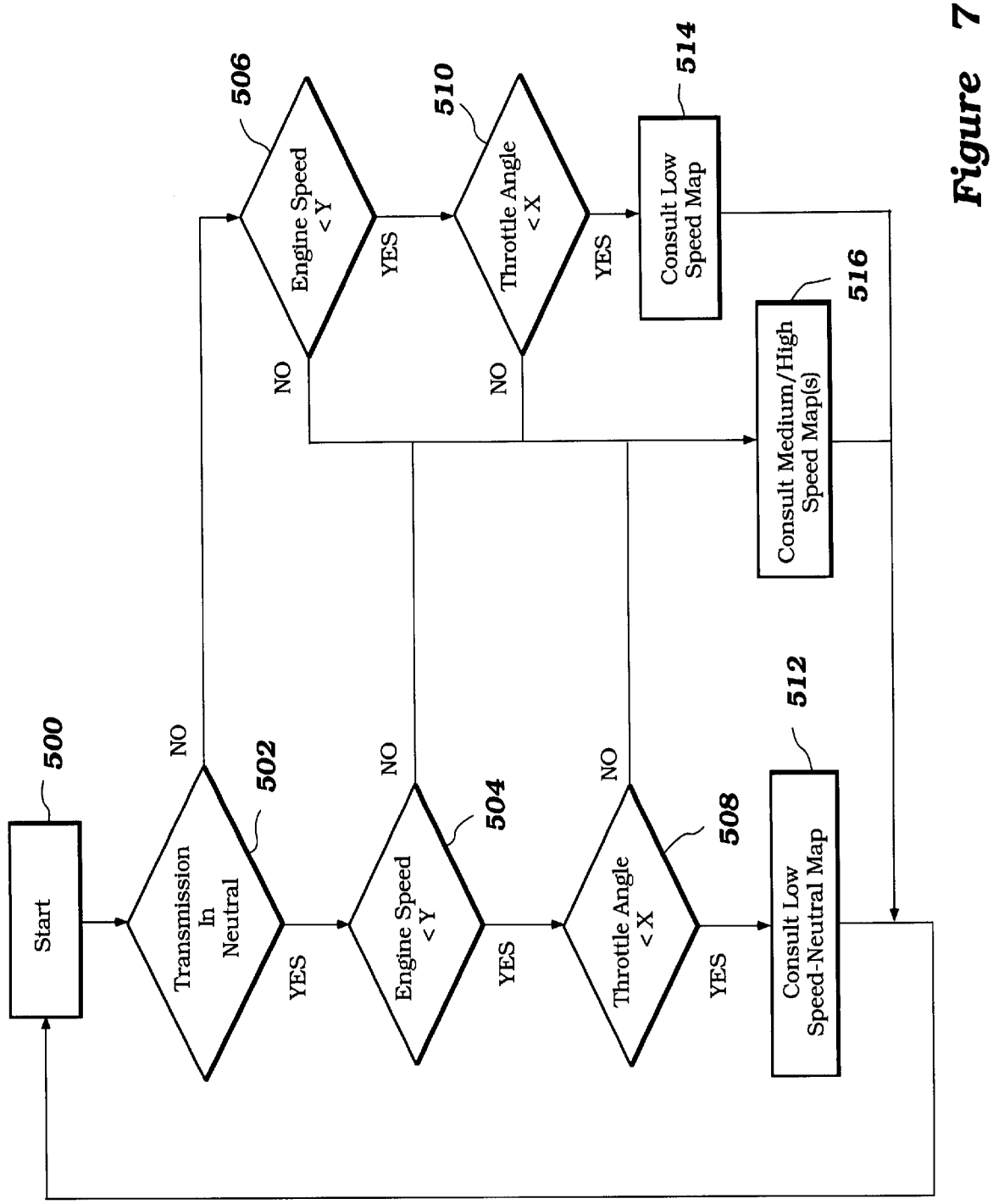
FIG. 7 is an exemplary routine used to employ the aspect of the present invention depicted in FIG. 6.

With continued reference to FIG. 7, in the event that either the engine speed exceeds the preset speed or the throttle angle exceeds the preset angle, the ECU 108 consults a medium- and/or high-speed map or maps to control the engine operation (516). In this manner, similar to the arrangements of FIGS. 2 and 3 and 4 and 5, the ECU 108 can alter the engine operating parameters based upon the engine operating conditions, which conditions include engine speed and throttle angle to result in better low-speed operation of the engine in the illustrated arrangement. More specifically, the engine benefits from a slightly more open throttle which increases the scavenge airflow to increase the scavenge efficiency. Thus, less exhaust gases remain in the cylinder at the end of the exhaust stroke and a better combustible mixture remains within the cylinder for combustion. This, as will be recognized by those of ordinary skill in the art, results in more consistent power output per cylinder per engine cycle.

Figure 8:
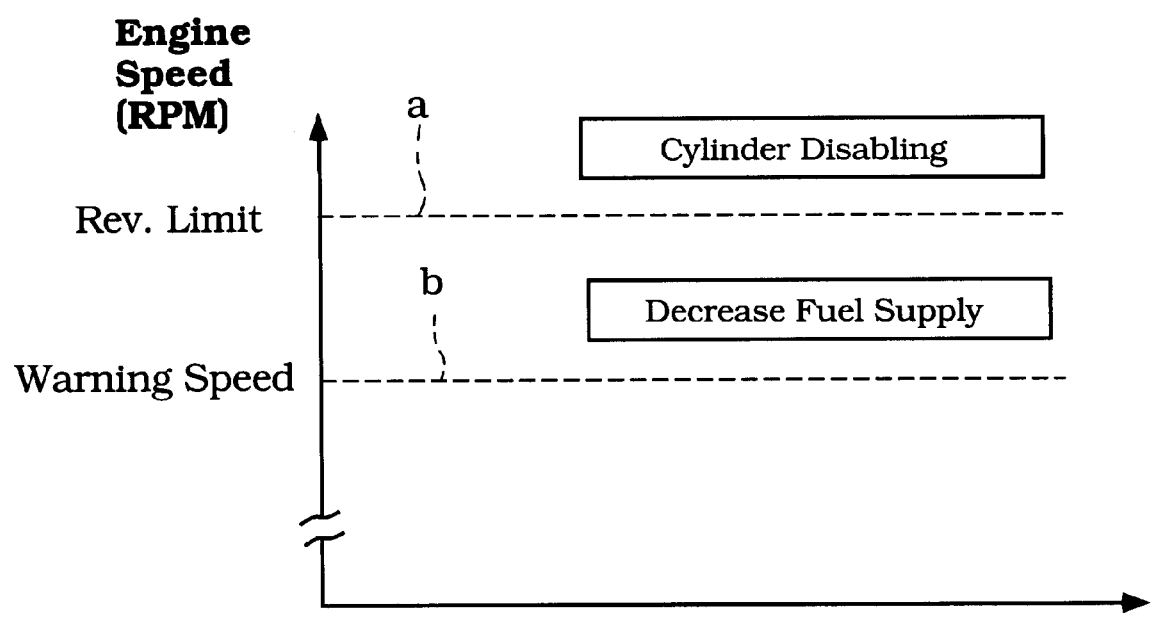
FIG. 8 is a graphical illustration of a relationship between an over revolution engine speed and a warning engine speed for use in certain aspects of the present invention, and a relationship between certain evasive actions and these engine speeds.

With reference now to FIG. 8, another aspect of the present invention involves maintaining the engine speed below a rev limit through fuel supply reduction and cylinder disabling. FIG. 8 is a graphical illustration of when fuel supply is decreased and when a cylinder is disabled in engines using certain features of this aspect of the invention. More particularly, a warning speed set at a preset speed "b" indicates that the fuel supply should be decreased to try to slow the engine speed. As will be recognized by those of ordinary skill in the art, decreasing the fuel supply in a direct injection engine decreases the power, thereby decreasing the speed of the engine. In some instances, however, even decreasing the fuel supply will not reduce the speed enough to avoid over-revving the engine. As used herein, over-revving is defined as exceeding a rev limit such as that indicated by the line "a" in FIG. 8 or otherwise exceeding a preset engine speed, for instance. In instances in which the speed exceeds the rev limit "a", at least one cylinder is disabled to reduce the engine speed. As also will be recognized by those of skill in the art, disabling cylinders generally results in decreased power and, therefore, a slower engine speed.

Figure 9:
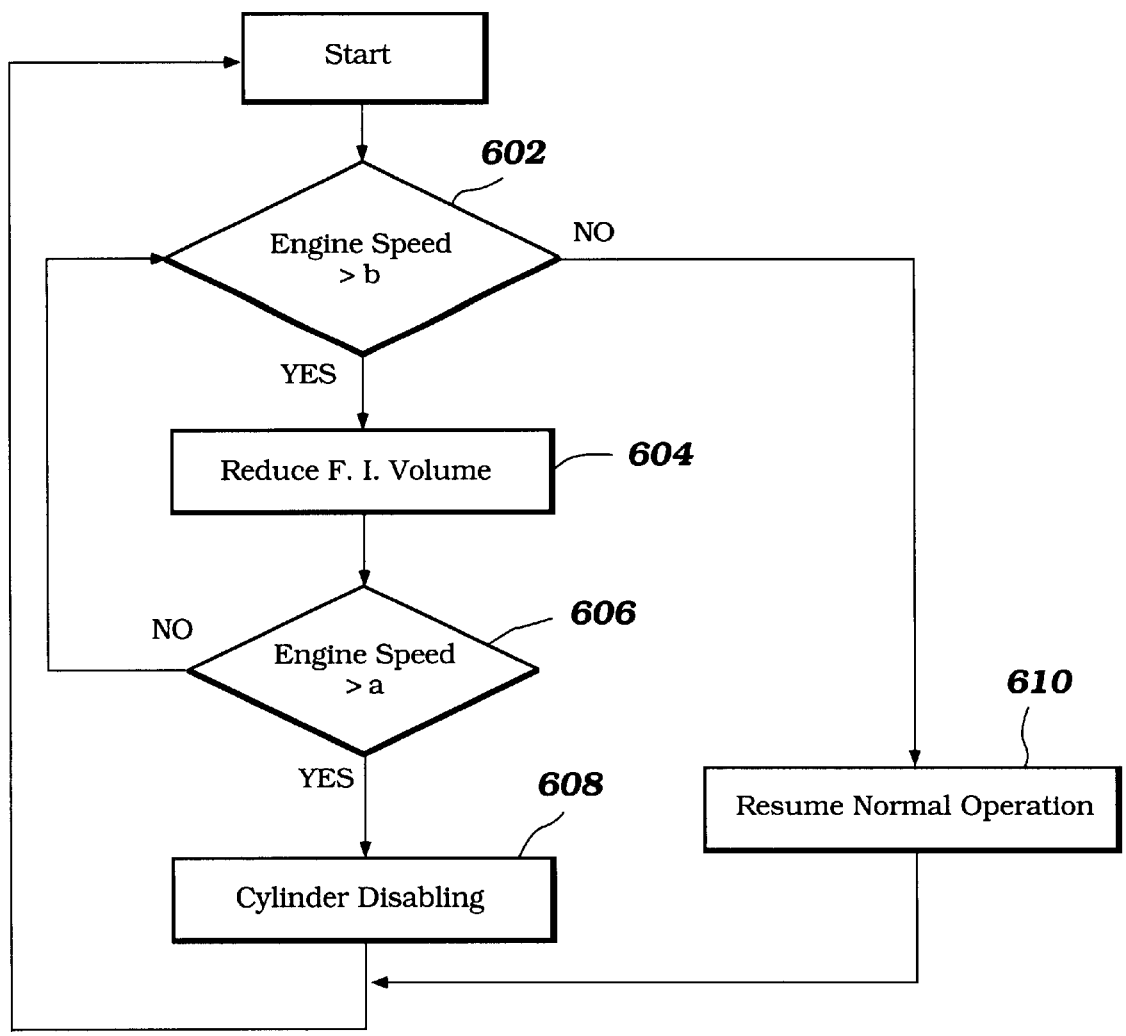
FIG. 9 is an exemplary routine used to employ the aspect of the present invention depicted in FIG. 8.

With reference now to FIGS. 9–12, four arrangements of this aspect of the present invention and having certain features and aspects in common are illustrated therein. In these arrangements, four different subroutines are used to reduce the likelihood of over-revving of the engine. In a first arrangement, which is illustrated in FIG. 9, the ECU 108 samples the engine speed such as through the sensor 212. If the engine speed exceeds the warning speed (602), the ECU 108 reduces the fuel injection volume (604). Reducing the fuel injection volume can take place in any number of manners. For instance, in one application, the pressure within the fuel injection supply line 164 can be reduced using the bypass passage 194 by opening the bypass valve 196. In other applications, the solenoid can be activated for different periods such that the fuel injector injects for a shorter duration. The shorter duration, of course, results in a decreased throughput volume of injected fuel.

The ECU 108 then checks the engine speed again and compares it to the over-rev limit (606). The preset over-rev limit can be approximately 6000 rpm in some arrangements, while a warning speed can be approximately 5800 rpm. Of course, these engine speeds can vary depending upon the engine application, however, in the illustrated arrangement featuring a V6 engine, it has been found that the 6000 rpm is the maximum speed at which the manufacturer prefers to run the engine. Accordingly, a warning speed is selected that is slightly less than this speed, such as 5800 in the illustrated arrangement.

If the engine speed has not exceeded the over-rev limit speed, the ECU 108 continues to monitor the engine speed to see whether the volume of fuel injected into each cylinder needs to be continued at a reduced level (602). In instances in which the engine speed has indeed exceeded the over-rev limit speed "a", the ECU 108 begins to disable at least one cylinder (608). The ECU 108 can disable cylinders (608) in any suitable manner. For instance, the ECU 108 can stop firing of the spark plugs 110 by interrupting the ignition system or the ECU 108 can interrupt the supply of fuel to the fuel injectors 112, as desired. Of course, other suitable methods of interrupting the firing of certain cylinders also can be used. In addition, the particular cylinders interrupted preferably are chosen such that the engine runs smoothly even with the interrupted cylinders. Disabling cylinders and the order of disabling which cylinders are well-known to those of ordinary skill in the art and need not be disclosed herein in order to practice the present invention.

With continued reference to FIG. 9, in the event the engine speed is detected to be lower than the warning speed "b" by the ECU 108, the engine is operated in a normal manner with all cylinders firing using a proportional fuel injection volume suitable for operation during normal operating conditions (610). Of course, the fuel injection volume can be varied according to various maps well known to those of ordinary skill in the art.

Figure 10:
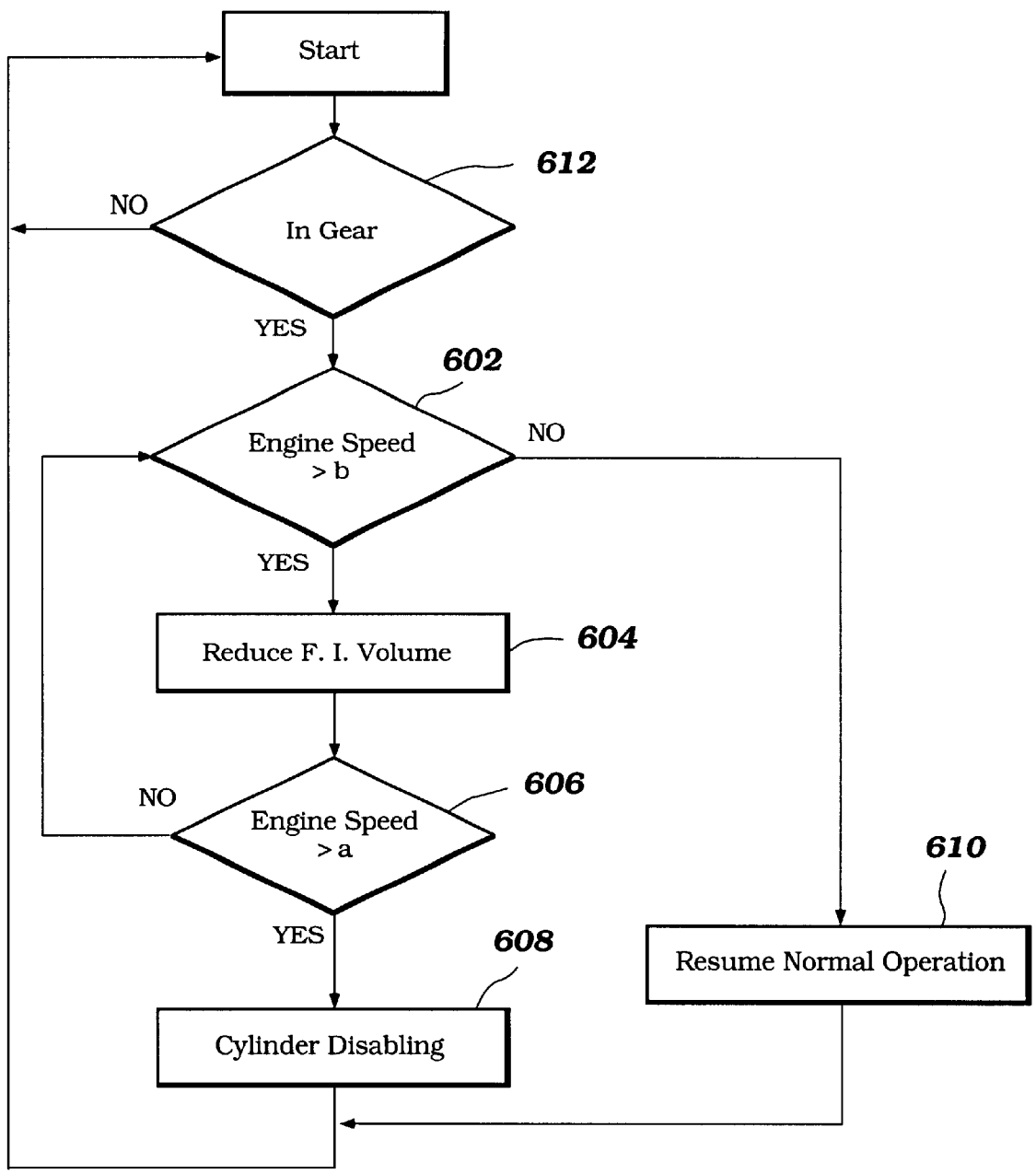
FIG. 10 is another exemplary routine used to employ the aspect of the present invention depicted in FIG. 8 that involves taking the evasive actions under certain shift positions.
Figure 11:
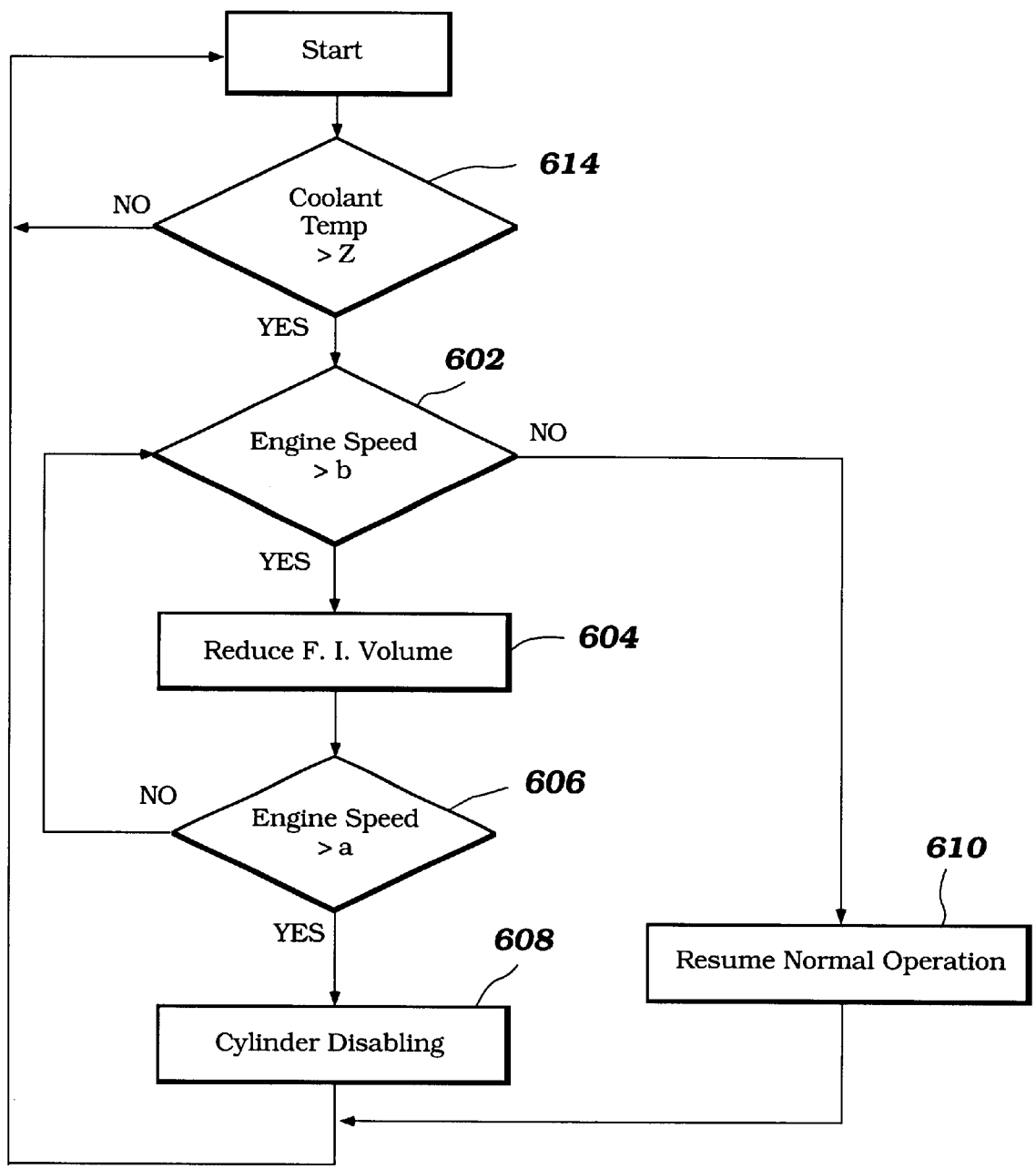
FIG. 11 is a further exemplary routine used to employ the aspect of the present invention depicted in FIG. 8 that involves taking the evasive actions after a coolant temperature has exceeded a preset threshold.
Figure 12:
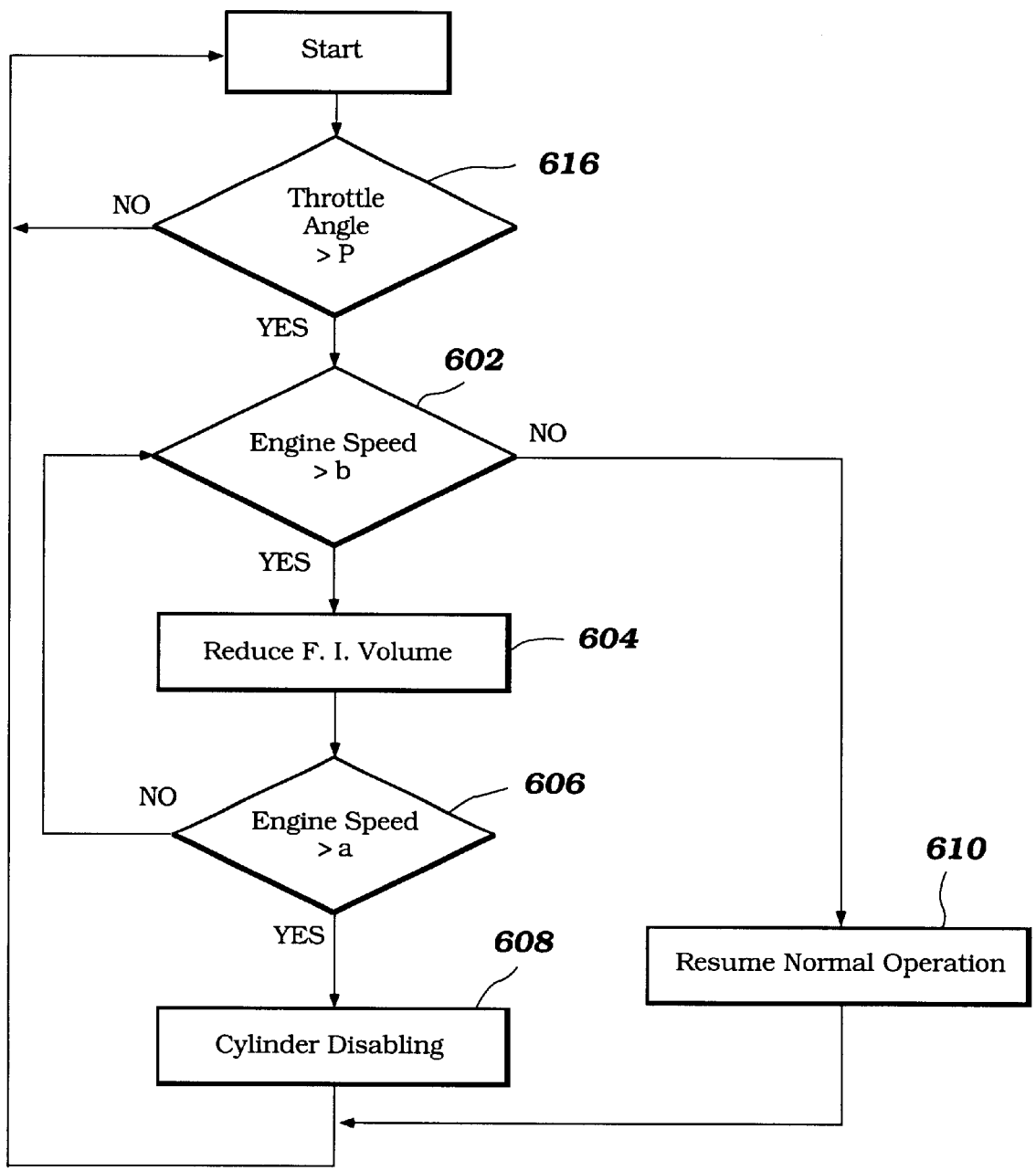
FIG. 12 is another exemplary routine used to employ the aspect of the present invention depicted in FIG. 8 that involves taking the evasive actions after the throttle angle has exceeded a preset threshold.

With reference now to FIGS. 10, 11, and 12, three additional arrangements adapted to reduce over-revving of the engine are illustrated therein. A comparison of the three figures reveals similarities between the three other arrangements. In addition, a comparison to FIG. 9 of FIGS. 10–12 exposes a core subroutine which is used in each of FIGS. 10, 11, and 12, namely that involving components 602–610, which were described above. Accordingly, in FIGS. 10–12, these steps have been maintained with the same numbering and further description of these steps is deemed unnecessary. It will be noted, however, that the condition under which the routine disclosed in FIG. 9 is employed varies in each of the routines shown in FIGS. 10–12. For instance, in FIG. 10, when the ECU 108 determines that the outboard motor 20 is in a drive condition, the core subroutine begins. This evaluation occurs within the decision block 612. As illustrated, if the ECU 108 determines that the outboard motor 20 is in neutral, the ECU 108 preferably does not control over-revving.

With reference now to FIG. 11, after the engine has warmed up, as indicated by a coolant temperature, the routine of FIG. 11 begins controlling over-revving through the routine disclosed in FIG. 9. More specifically, a preset temperature Z is compared against a sensed coolant temperature (614). As will be recognized by those of skill in the art, the coolant temperature will increase as the engine warms up. Once the sensed temperature has exceeded preset temperature Z, which in some arrangements is approximately 50° C., the routine continues by checking the engine speed against both the warning speed "b" and the maximum tolerance speed or the over-rev speed "a". If, however, the coolant temperature has not reached the preset temperature, the routine continues to cycle until such a state has occurred (614).

With reference now to FIG. 12, again this routine varies from that of FIG. 9 by waiting until the throttle angle has exceeded a predetermined angle P, which can be approximately 60° in some applications, before controlling over-revving of the engine. Accordingly, the ECU 108 samples the throttle angle through the throttle angle sensor 214 and compares it against a preset throttle angle (616). If the throttle angle has not yet exceeded the preset throttle angle P, then the routine continues to loop until the sensed throttle angle exceeds the present throttle angle P. After the throttle angle has exceeded the throttle angle P, the sensed engine speed then is checked against the warning speed (602) and the over-rev speed (606) and the fuel injection volume reduction (604) and the cylinder disabling (608) are employed as necessary.

As will be recognized, each of these four different arrangements for controlling engine over-rev can be used together or apart from the others. For instance, in some applications, one may choose to monitor both the throttle angle position and the coolant temperature. In other applications, one may choose to monitor the positioning of the transmission as well as the throttle angle, for instance, to determine when the outboard motor has completed its warm-up cycle.

Figure 13:
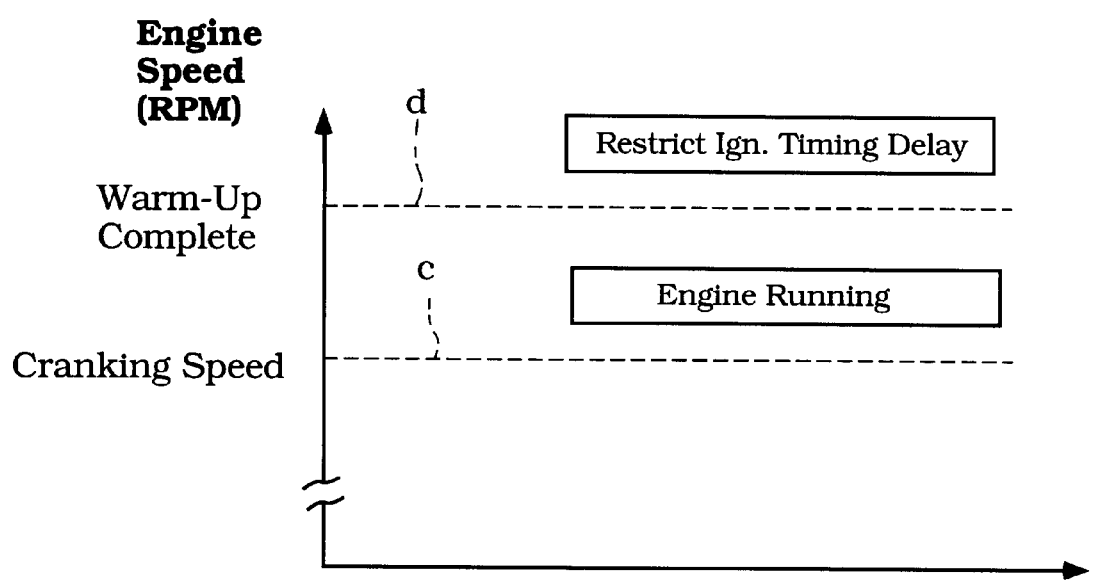
FIG. 13 is a graphical illustration between a cranking speed and a warmed-up speed and a relationship between certain other evasive actions.

With reference now to FIG. 13, a graph comparing an exemplary warm-up complete engine speed to an exemplary cranking engine speed is illustrated therein. Another aspect of the present invention involves restricting an ignition timing delay to conditions following a complete warm-up cycle, to better ensure that the engine has sufficiently warmed up. Such an arrangement is advantageous because it reduces the likelihood of the engine speed falling off too quickly thereby causing stalling under extreme operating conditions. This will be better understood with reference to FIG. 14.

Figure 14:
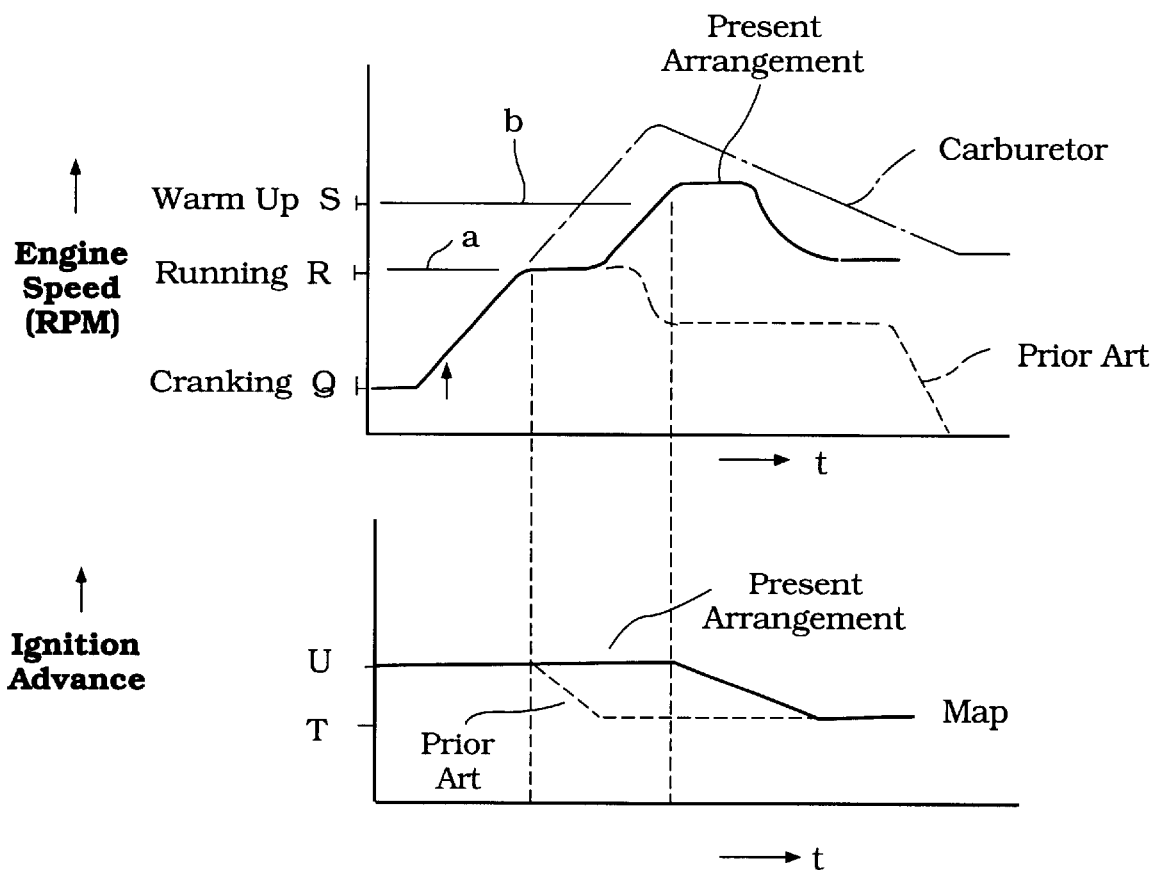
FIG. 14 is a superimposed graphical illustration of engine speed and ignition advance as a function of engine speed over time which compares an ignition advance dwell in a system configured in accordance with certain aspects of the present invention against a prior art fuel injection system and a carbureted system.

With reference now to FIG. 14, a prior art arrangement, which is illustrated in dashed lines, featured a first ignition advance for a preset period during which the engine speed increased from a cranking speed to an engine running speed. After the engine running speed had been reached, however, the ignition timing advance was decreased to a value T. As illustrated in the top graph of FIG. 14, such a reduction in ignition timing advance would often result in the actual engine speed decreasing and, under extreme operating conditions, stalling out, as illustrated by the dashed line dropping down to below the cranking speed. Accordingly, one aspect of the present invention involves maintaining the ignition advance until a sensed engine speed exceeds the running speed such that the ignition advance is not decreased until after the engine has achieved a more completely warmed-up state. It should be noted that this also differs from that of a carbureted engine or an indirect injected engine, which is illustrated in the phantom line, in that the engine speed does not need to increase to the degree of the carbureted engine and accordingly the engine is more responsive just after warm-up.

Figure 15:
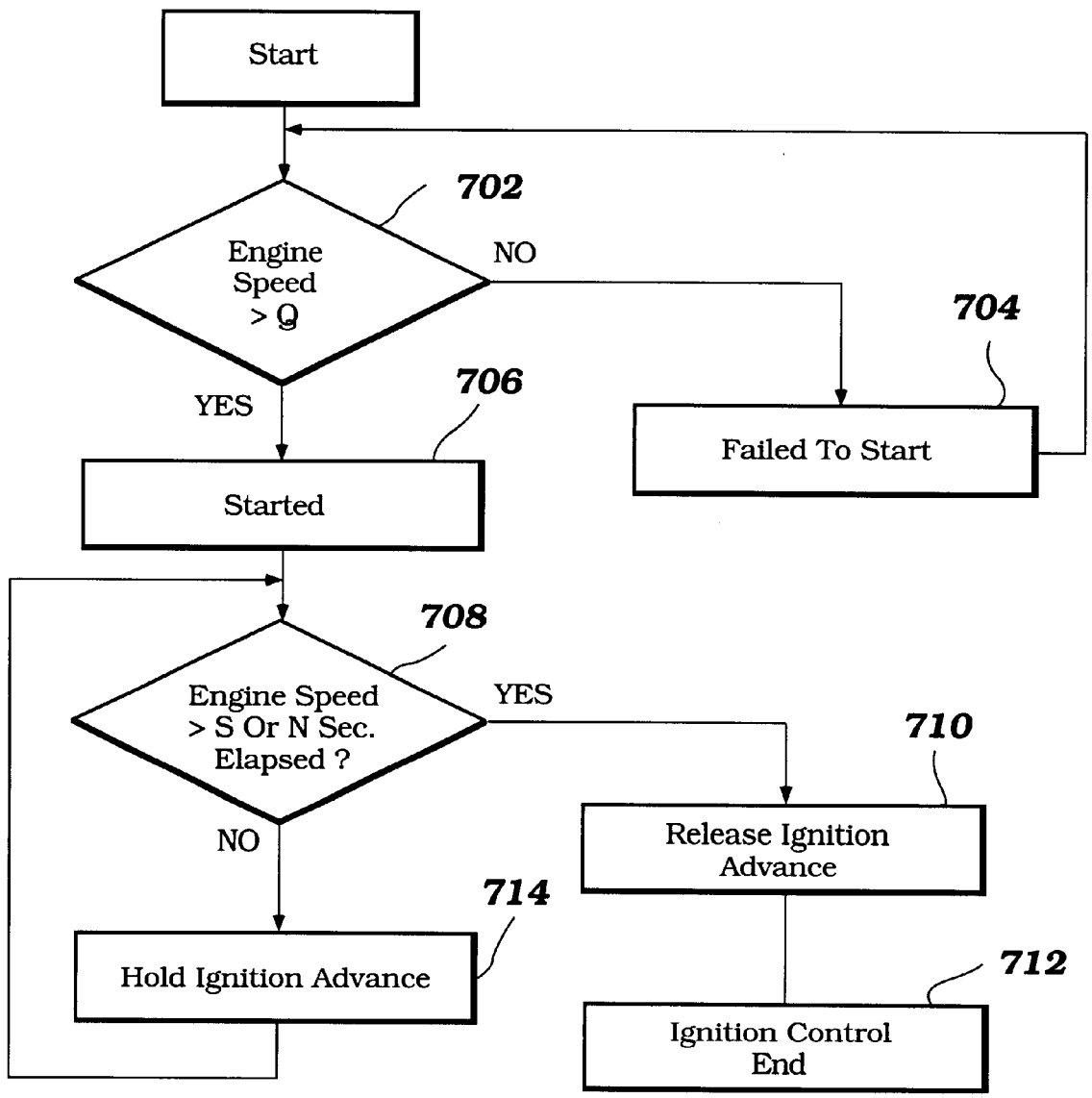
FIG. 15 is an exemplary routine used to employ the ignition advance dwell feature depicted in FIG. 14.

With reference now to FIG. 15, a preferred control routine is illustrated therein. This control routine is exemplary of those that can be used to result in engine operating conditions such as those depicted in FIG. 14. The control routine begins with the ECU 108 sampling the engine speed in any suitable manner. In the illustrated arrangement, the engine speed is sensed through the sensor 212. The engine speed is then compared against a preset engine speed Q (702). In one arrangement, the preset engine speed Q is a cranking speed. A cranking speed is known to those of ordinary skill in the art as a speed at which the starter motor turns the crankshaft prior to ignition in continued operation of the engine. In the illustrated arrangement, for instance, the cranking speed is approximately 200 rpm. Of course this value can differ depending upon the application.

In the control routine illustrated in FIG. 15, if the engine speed is below the first preset engine speed Q, then the ECU 108 determines that the engine has failed to start (704). If, however, the engine speed exceeds the first preset engine speed Q, then the ECU 108 determines that the engine has started (706). If the engine starts, then the ECU continues to monitor the engine speed, such as through the sensor 212, for instance. If the engine speed exceeds a second predetermined speed S or if a preset period of time has elapsed, then the ECU 108 releases the ignition advance and ends the ignition control routine (710, 712).

If, however, the engine speed has not yet exceeded the second preset engine speed S, or the preset period of time has not elapsed (708), the ECU 108 continues to hold the ignition advance (714). The ignition advance is held until the engine speed eventually does exceed the second preset engine speed S or the preset period has elapsed. In the illustrated arrangement, the preset engine speed S is determined to be a warm-up speed or a speed indicative of a warmed-up engine. This speed can be approximately 1000 rpm in some arrangements. This is greater than the speed at which the engine is barely running or the lowest operating speed of the engine (i.e., that such as trolling speed), which is determined to be approximately 700 rpm in the illustrated arrangement.

With reference again to FIG. 14, the ignition advance illustrated in FIG. 14 can vary depending upon the application. However, in the illustrated arrangement, the advance varies from U which is about 7° to T which is about 4°. Of course, these values can vary depending upon the application; however, these are the presently preferred values for the illustrated application.

Figure 16:
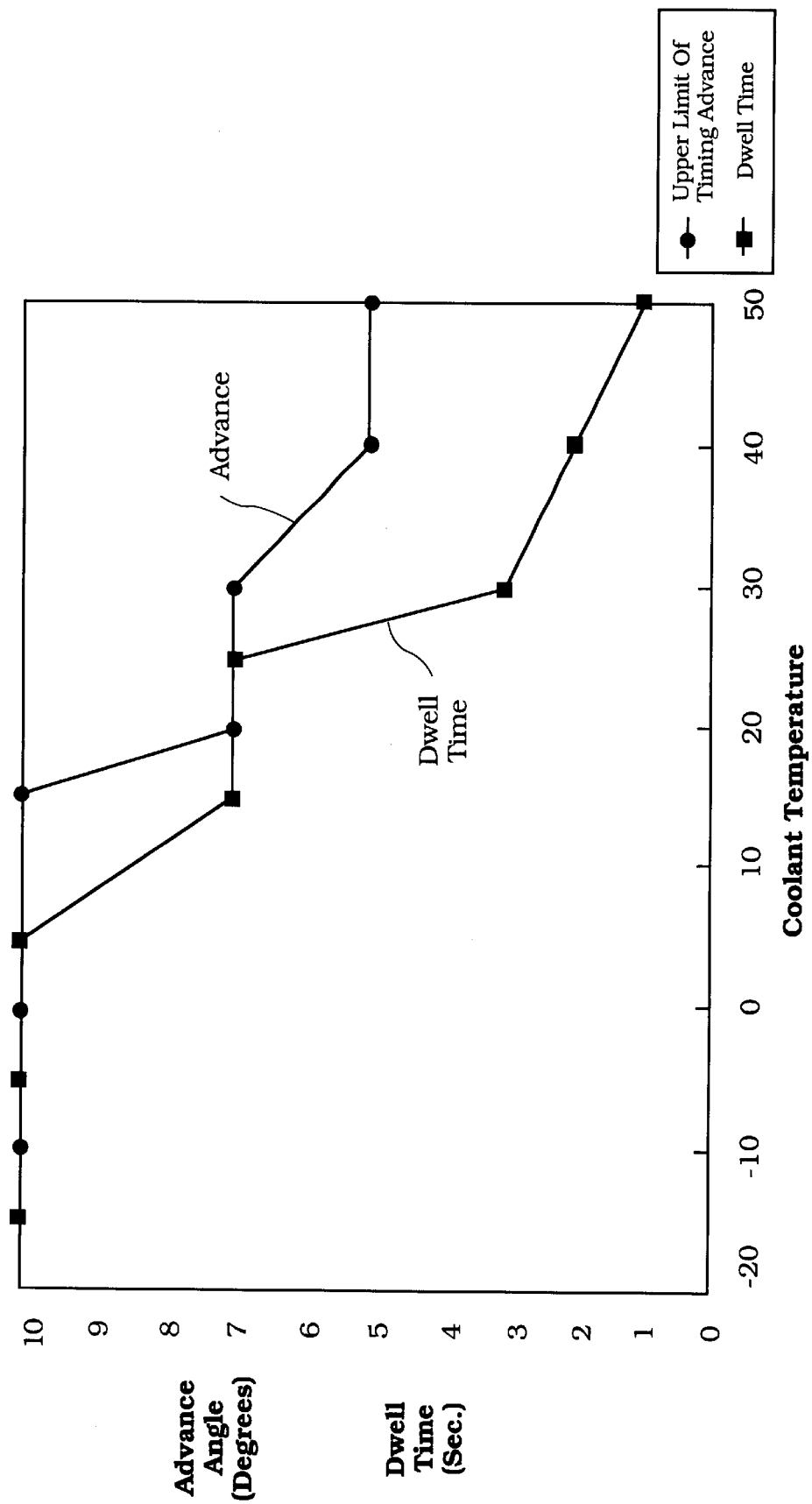
FIG. 16 is a graphical illustration of another ignition advance dwell arrangement.
Figure 17:
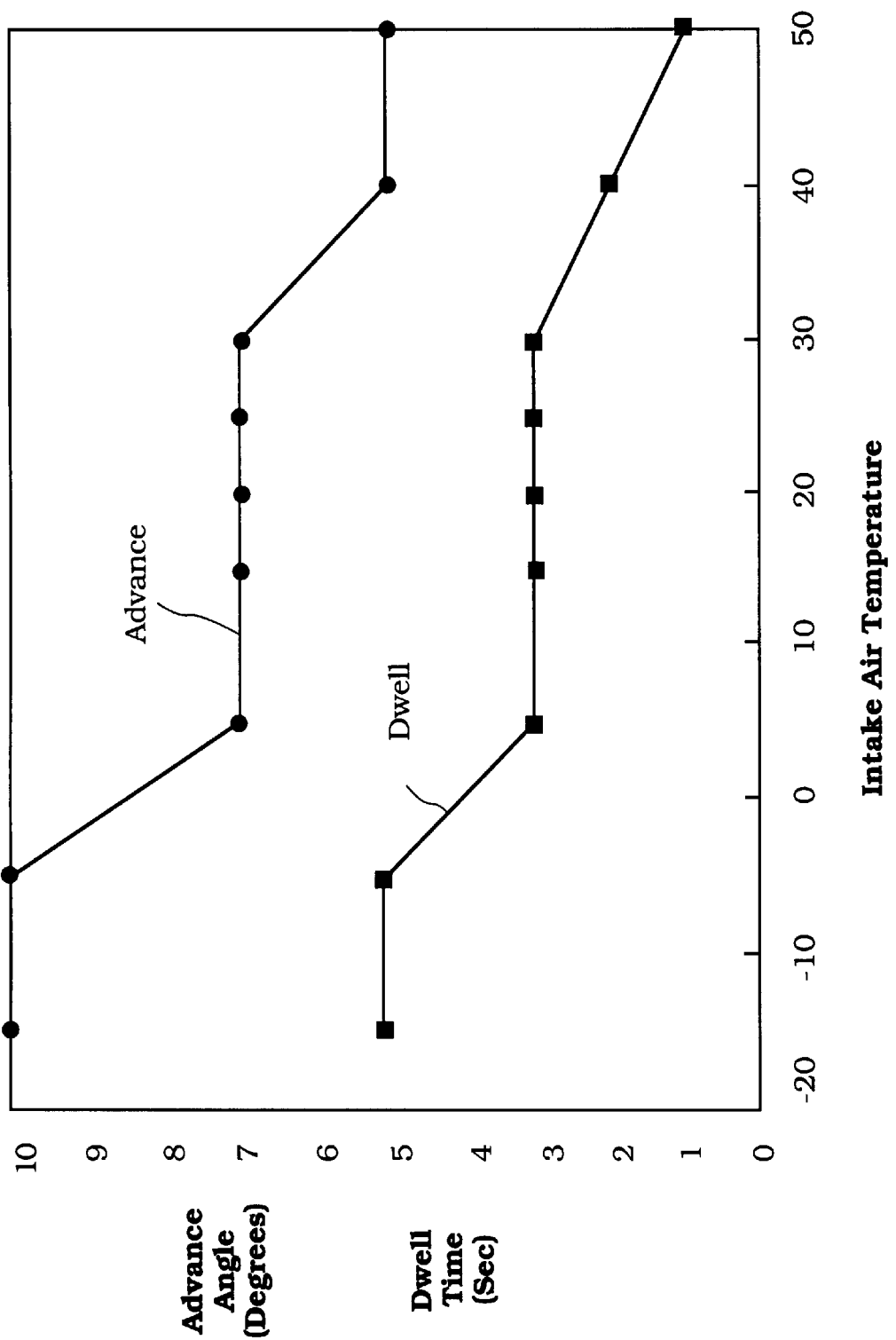
FIG. 17 is a further graphical illustration of another ignition advance dwell arrangement.

With reference now to FIGS. 16–17, two additional arrangements for controlling the ignition advance are illustrated therein. In FIG. 16, the illustrated dwell time, which is indicated in squares, varies along with the timing advance, which is indicated by circles.

More particularly, in the illustrated arrangement of FIG. 16, following ignition, the advance angles are about 10°, about 7°, and about 5° if the engine coolant temperatures are respectively about −15° C. to about 15° C., about 15° C. to about 30° C., and about 40° C. to about 50° C. The holding times are determined to be about 10 seconds, about 7 seconds, and about 3–1 seconds, depending upon the engine coolant temperatures. For instance, the holding time or dwell time is about 10 seconds if the coolant temperature is about −15° C. to about 5° C. The dwell time is about 7 seconds if the engine coolant temperature is determined to be about 15°–about 25° C. while the dwell time is determined to be between about 3 to 1 seconds if the engine coolant temperature is between about 30° and about 50° C. In general, the cooler the coolant temperature, the greater and longer the advanced angles and holding times. This arrangement allows the lubricant to become heated with the higher speed operation of the engine. In addition, this arrangement reduces the start-up friction associated with the pistons and the crankshaft by increasing the power. Thus, in this arrangement, fluctuations of the engine speed can be reduced and the occurrence of engine stall can be minimized.

With reference now to FIG. 17, another arrangement is illustrated therein. In this arrangement, the timing advance angles are determined to be about 10°, about 7°, and about 5°, depending on the air intake temperature. More particularly, the advance angle is preferably about 10° if the air intake temperature is between about −15° and about 15° C. In other arrangements, the advance angle can be about 7°, if the intake air temperature is approximately 5 to about 30° C. The advance angle can be approximately 5° if the intake air temperature is approximately 35 to about 40° C. The holding times, as with those described above, are typically longer, the cooler the intake air temperature. For instance, if the intake air temperature is approximately −15° to about 15° C., the dwell time is approximately 5 seconds. If the intake air temperature is between about 5° and about 30° C., the holding time is approximately 3 seconds, and if the air temperature is between about 35° and about 40° C., the holding time is approximately 2 to 1 seconds, depending upon the application. In general, it can be seen that the cooler the engine intake air temperature, the greater the advance angles and the longer the dwell time. Accordingly, the temperature inside the combustion chamber can be increased incrementally which allows better atomization of the gasoline. In addition, the better atomization of the gasoline results in more consistent fuel combustion. Because of the more consistent fuel combustion, engine speed fluctuations and occurrences of engine stall can be reduced.

In addition, it will be recognized that the atomization of the fuel can be inhibited in low air temperature operations. Advancing the engine ignition system, however, works to overcome this problem and results in the aforedescribed advantages. As with the arrangements described above, the advance angles and the holding times can be modified depending upon the gear shift positions. For example, if the gear shift is in a drive arrangement, the advance angle is set to be approximately 10° and the holding time is set to be approximately 5 seconds. However, if the gear shift position is in a neutral position, the advance angle preferably is increased to only about 5° rather than about 10° and the holding time is shortened to about 3 seconds, as compared to about 5 seconds. As will be recognized, this decrease in the advance angle and the holding time is possible due to the decreased load on the outboard motor if the engine is in a neutral position. Of course, when the outboard motor is shifted into a drive position, the outboard motor loads the engine with a propulsion load and the advance needs to be increased and the holding time increased to attain the benefits described above.

Although the present invention has been described in terms of certain preferred embodiments, other embodiments apparent to those of ordinary skill in the art also are within the scope of this invention. Thus, various changes, modifications, and alterations may be made in the above-described embodiments without departing from the spirit and scope of the invention. For instance, when a function depends upon two sensed variables, such as engine speed and throttle position, the two variables can be compared to corresponding preset values in any order. Moreover, not all the features, aspects, and advantages are necessarily required to practice the present invention. Therefore, some of the features, aspects, and advantages may be separately practiced from other features, aspects, and advantages while still practicing a part or all of the above-described invention. Accordingly, the scope of the present invention is intended to be defined only by the claims that follow.

What is claimed is:

1. An outboard motor comprising an engine and a propulsion unit, said engine having an output shaft and said propulsion unit comprising a propeller shaft, a shiftable transmission being interposed between said output shaft and said propulsion unit, said shiftable transmission being adapted to move between a neutral state and a drive state whereby movement of said output shaft is removed from said propeller shaft when said shiftable transmission is in said neutral state and movement of said output shaft is transferred to said propeller shaft when said shiftable transmission is in said drive state, said outboard motor further comprising a control unit adapted to control at least one operating parameter of said engine, a shift detector being in electrical communication with said control unit and being adapted to output a signal indicative of a shift state of said shiftable transmission, an engine speed sensor being in electrical communication with said control unit and being adapted to output a signal indicative of an engine speed, a throttle angle sensor being in electrical communication with said control unit and being adapted to output a signal indicative of a throttle angle, said control outputting a first signal if a first input condition is satisfied and outputting a second signal if a second input condition is satisfied.

2. The motor of claim 1, wherein said first input condition comprises said engine speed signal indicating that a detected engine speed is less than a preset engine speed, said throttle angle signal indicating that a detected throttle angle is less than a preset throttle angle and said shift state signal indicating that a detected transmission state is said neutral state and said second input condition comprises said engine speed signal indicating that said detected engine speed is less than said preset engine speed, said throttle angle signal indicating that said detected throttle angle is less than said preset throttle angle and said shift state signal indicating that said detected transmission state is said drive state.

3. The motor of claim 2, wherein said engine comprises a first cylinder and a second cylinder and said first signal disables said first cylinder and said second cylinder.

4. The motor of claim 3, wherein said engine further comprises an ignition system, said ignition system comprising a first spark plug and a second spark plug, said first spark plug being associated with said first cylinder and said second spark plug being associated with said second cylinder, said control being in electrical communication with said ignition system and said first signal disabling an ignition of said first spark plug and an ignition of said second spark plug.

5. The motor of claim 3, wherein said engine comprises a fuel injection system, said fuel injection system comprising a first fuel injector and a second fuel injector, said first fuel injector being associated with said first cylinder and said second fuel injector being associated with said second cylinder, said control being in electrical communication with said fuel injection system and said first signal disabling an injection of fuel by said first fuel injector and an injection of fuel by said second fuel injector.

6. The motor of claim 3, wherein said engine further comprises an ignition system, said ignition system comprising a first spark plug and a second spark plug, said first spark plug being associated with said first cylinder and said second spark plug being associated with said second cylinder, said control being in electrical communication with said ignition system and said second signal disabling an ignition of one of said first spark plug and said second spark plug.

7. The motor of claim 3, wherein said engine comprises a fuel injection system, said fuel injection system comprising a first fuel injector and a second fuel injector, said first fuel injector being associated with said first cylinder and said second fuel injector being associated with said second cylinder, said control being in electrical communication with said fuel injection system and said second signal disabling an injection of fuel by one of said first fuel injector and said second fuel injector.

8. The motor of claim 2, wherein said engine further comprises at least one cylinder, an ignition system and a fuel injection system, said ignition system comprising at least one spark plug and said fuel injection system comprising at least one fuel injector, said fuel injector being positioned to inject fuel directly into said cylinder and said spark plug being positioned to ignite said fuel in said cylinder.

9. The motor of claim 8, wherein said first signal alters fuel injection timing as compared to normal fuel injection timing.

10. The motor of claim 8, wherein said first signal and said second signal are associated with different fuel injection timings.

11. The motor of claim 8, wherein said first signal and said second signal are associated with different fuel injection volumes.

12. The motor of claim 8, wherein said first signal and said second signal are associated with different ignition timings.

13. The motor of claim 8, wherein said first signal is output from a first map and said second signal is output from a second map.

14. The motor of claim 8, wherein said first signal alters fuel injection volume as compared to normal fuel injection volume.

15. The motor of claim 8, wherein said first signal alters ignition timing as compared to normal ignition timing.

16. The motor of claim 1, wherein said first input condition comprises a sensed engine speed being higher than a first present engine speed and the second input condition comprises said sensed engine speed being higher that a second preset engine speed, said second preset engine speed being higher than said first preset engine speed.

17. The motor of claim 16, wherein said engine further comprises a fuel supply system and at least one cylinder, said fuel supply system communicating with said cylinder to supply fuel to said cylinder for combustion, said first signal being received by said fuel supply system and being adapted to reduce a fuel supply volume being supplied by said fuel supply system to said cylinder.

18. The motor of claim 17, wherein said fuel supply system comprises a fuel injector positioned to inject fuel directly into said cylinder.

19. The motor of claim 18, wherein a fuel supply conduit communicates with said fuel injector and a pressure within said supply line is reduced as a result of said first signal.

20. The motor of claim 18, wherein said fuel injector is opened for a shorter period of time than normal in response to said first signal.

21. The motor of claim 18, wherein said fuel injector opens with a different pulse pattern than normal in response to said first signal.

22. The motor of claim 17, wherein said second signal is adapted to disable at least one cylinder of said engine.

23. The motor of claim 22, wherein said second signal interrupts ignition of an ignition system associated with said cylinder.

24. The motor of claim 22, wherein said second signal interrupts operation of a fuel injector associated with said cylinder.

25. The motor of claim 22, wherein said engine resumes normal operation when said sensed engine speed is lower than said first preset engine speed.

26. The motor of claim 1, wherein said first input condition comprises a sensed engine speed being higher than a starter engine speed and said second input condition comprises said sensed engine speed being higher than a warmed-up engine speed.

27. The motor of claim 26, wherein said engine comprises an ignition system and said first signal is adapted to advance an ignition signal to a first preset value until said second signal is received, which second signal results from said sensed engine speed exceeding said warmed-up engine speed.

28. The motor of claim 1, wherein said first input condition comprises a sensed engine speed being higher than a starter engine speed and said second input condition comprises a preset period of ignition advance has elapsed.

29. The motor of claim 28, wherein said engine comprises an ignition system and said first signal is adapted to advance an ignition signal to a first present value until said second signal is received, which second signal results from said preset period of time elapsing.

30. The motor of claim 28, wherein said preset period of time and a degree of engine ignition advance both decrease as a sensed coolant temperature increases.

31. The motor of claim 28, wherein said preset period of time and a degree of engine ignition advance both decrease as a sensed intake air temperature increases.

32. The motor of claim 28, wherein said preset period of time and a degree of engine ignition advance have first respective values with said transmission in said neutral state and said preset period of time and said degree of engine ignition advance have second respective values with said transmission in said drive state, and said first respective values are less than said second respective values.

33. A method of controlling a direct injected engine with a controller comprising sensing a shift position, sensing an engine speed, comparing said sensed engine speed to a preset engine speed, sensing a throttle position, comparing said sensed throttle position to a preset throttle position and taking a first action depending upon said sensed shift position if said sensed engine speed is lower than said preset engine speed and said sensed throttle position is lower than said preset throttle position.

34. The method of claim 33, wherein said first action comprises disabling at least one cylinder.

35. The method of claim 34, wherein a first preset number of cylinders is disabled if said sensed shift position is neutral.

36. The method of claim 35, wherein said first preset number of cylinders is one.

37. The method of claim 34, wherein a second preset number of cylinders is disabled if said sensed shift position is drive.

38. The method of claim 37, wherein said second preset number of cylinders is two.

39. The method of claim 37, further comprising disabling a first preset number of cylinders if said sensed shift position is neutral.

40. The method of claim 34, wherein all cylinders are normally fired if said sensed engine speed exceeds said preset engine speed.

41. The method of claim 34, wherein all cylinders are normally fired if said sensed throttle angle exceeds said preset throttle angle.

42. The method of claim 33, wherein said first action comprises altering at least one engine operating parameter.

43. The method of claim 42, wherein said engine operating parameter is ignition timing.

44. The method of claim 42, wherein said engine operating parameter is altered according to a first value if said sensed shift position is neutral.

45. The method of claim 42, wherein said engine operating parameter is altered according to a second value if said sensed shift posit on is drive.

46. The method of claim 45, further comprising disabling a first preset number of cylinders if said sensed shift position is neutral.

47. The method of claim 42, wherein all parameters are returned to normal operating conditions if said sensed engine speed exceeds said preset engine speed.

48. The method of claim 42, wherein all parameters are returned to normal operating conditions if said sensed throttle angle exceeds said preset throttle angle.

49. The method of claim 42, wherein said engine operating parameter is fuel injection timing.

50. The method of claim 33, wherein said first action comprises consulting at least one of a plurality of maps.

51. The method of claim 50, wherein a first map is selected if said sensed shift position is neutral.

52. The method of claim 50, wherein a second map is selected if said sensed shift position is drive.

53. The method of claim 52, further comprising selecting a first map if said sensed shift position is neutral.

54. The method of claim 50, wherein a third map is selected if said sensed engine speed exceeds said preset engine speed.

55. The method of claim 50, wherein a third map is selected if said sensed throttle angle exceeds said preset throttle angle.

56. A method of controlling a direct injected engine with a controller comprising an over revolution limiting routine comprising sensing an engine speed, comparing said sensed engine speed with a first preset speed, taking a first evasive action if said sensed engine speed exceeds said first preset speed, comparing said sensed engine speed with a second preset engine speed, taking a second evasive action if said sensed engine speed exceeds said second preset speed.

57. The method of claim 56 further comprising ceasing said first evasive action and said second evasive action when said sensed engine speed is reduced below said first preset engine speed.

58. The method of claim 56, wherein said first evasive action comprises reducing a fuel injection volume.

59. The method of claim 56, wherein said second evasive action comprises disabling at least one cylinder.

60. The method of claim 59, wherein said first evasive action comprises reducing a fuel injection volume.

61. The method of claim 56 further comprising sensing a shift position of a transmission associated with the engine and beginning said over revolution limiting routine if said sensed shift position corresponds to a drive engagement.

62. The method of claim 56 further comprising sensing a coolant temperature, comparing said sensed coolant temperature to a preset temperature and beginning said over revolution limiting routine if said sensed temperature exceeds said preset temperature.

63. The method of claim 56 further comprising sensing a throttle angle, comparing said sensed throttle angle to a preset throttle angle and beginning said over revolution limiting routine if said sensed throttle angle exceeds said preset throttle angle.

64. A method of controlling a direct injected engine with a controller comprising advancing an ignition timing of said engine a first preset advance amount, sensing an engine speed and starting a counter, comparing said sensed engine speed to a first preset speed and said counter value to a preset value, changing said ignition timing to a second preset advance amount when said sensed engine speed exceeds said first preset speed or said counter value exceeds said preset value.

65. The method of claim 64, wherein at least one of said preset advance amount and said preset value are decreased when a sensed coolant temperature increases.

66. The method of claim 64, herein at least one of said preset advance amount and said preset value are decreased when a sensed intake air temperature increases.

67. The method of claim 64, wherein at least one of said preset advance amount and said preset value are decreased when a sensed shift position is neutral.

68. An engine comprising at least one cylinder, a piston mounted for reciprocation within said cylinder, a cylinder head mounted to said cylinder and cooperating with said piston and said cylinder to define a variable volume combustion chamber, a fuel injector disposed to supply a fuel charge to said combustion chamber, a fuel supply system communicating with said fuel injector, said fuel supply system comprising a high pressure portion and a low pressure portion, said fuel injector being positioned along said high pressure portion, a bypass line connecting said high pressure portion and said low pressure portion, a valve being positioned along said bypass line, and a controller adapted to control said valve such that a flow rate through said bypass line can be controlled.

69. The engine of claim 68, further comprising a pressure regulator being interposed between said high pressure portion and said low pressure portion and said bypass line being connected to said high pressure portion upstream of said pressure regulator and to said low pressure portion downstream of said pressure regulator.

70. The engine of claim 68, wherein said low pressure portion comprises a fuel return line and said bypass line is connected to said fuel return line.

71. The engine of claim 68, wherein said valve is an electrically actuatable valve.

72. The engine of claim 68, wherein said bypass line comprises an inlet and an outlet and said valve is positioned along a portion of said bypass line located between said inlet and said outlet.

73. The engine of claim 68, wherein said valve is an open-close valve.

74. The engine of claim 68, wherein said valve is a flow rate regulating valve such that the valve is adapted to allowable variable flow rates.

* * * * *

UNITED STATES PATENT AND TRADEMARK OFFICE
CERTIFICATE OF CORRECTION

PATENT NO.     : 6,364,726 B1
DATED          : April 2, 2002
INVENTOR(S)    : Motose et al.

It is certified that error appears in the above-identified patent and that said Letters Patent is hereby corrected as shown below:

Column 21,
Line 42, "shift posit on" should be -- shift position --

Signed and Sealed this

Twenty-ninth Day of April, 2003

JAMES E. ROGAN
*Director of the United States Patent and Trademark Office*